United States Patent

Oniki et al.

(10) Patent No.: US 9,563,941 B2
(45) Date of Patent: Feb. 7, 2017

(54) IMAGE PROCESSING APPARATUS, IMAGE PICKUP APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Takashi Oniki, Chikusei (JP); Koshi Hatakeyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/508,199

(22) Filed: Oct. 7, 2014

(65) Prior Publication Data

US 2015/0097993 A1 Apr. 9, 2015

(30) Foreign Application Priority Data

Oct. 9, 2013 (JP) ................... 2013-211503
Dec. 9, 2013 (JP) ................... 2013-254578
Sep. 3, 2014 (JP) ................... 2014-178610

(51) Int. Cl.
*H04N 5/232* (2006.01)
*G06T 5/00* (2006.01)

(52) U.S. Cl.
CPC ........... *G06T 5/004* (2013.01); *H04N 5/23229* (2013.01)

(58) Field of Classification Search
CPC .................. H04N 5/217; H04N 5/3572
See application file for complete search history.

(56) References Cited

U.S. PATENT DOCUMENTS

| 6,724,702 B2 | 4/2004 | Taguchi et al. |
| 7,953,263 B2 | 5/2011 | Okamoto et al. |
| 8,514,304 B2 | 8/2013 | Hatakeyama |
| 8,866,937 B2 | 10/2014 | Kano |
| 9,007,482 B2 | 4/2015 | Hatakeyama et al. |
| 9,100,583 B2 | 8/2015 | Oniki et al. |
| 2005/0094896 A1 | 5/2005 | Masumura et al. |

(Continued)

FOREIGN PATENT DOCUMENTS

| CN | 102685511 A | 9/2012 |
| CN | 102833461 A | 12/2012 |

(Continued)

OTHER PUBLICATIONS

Office Action issued in U.S. Appl. No. 14/507,207, mailed Jan. 22, 2016.

(Continued)

*Primary Examiner* — Amy Hsu
(74) *Attorney, Agent, or Firm* — Rossi, Kimms & McDowell LLP

(57) ABSTRACT

An image processor includes a correction signal generator configured to generate a correction signal by calculating a difference between an image and an image obtained by applying an unsharp mask generated based on a PSF corresponding to an image-pickup conditions of an image-pickup optical system to the image, and a correction signal applier configured to sharpen the image by multiplying the correction signal generated by the generator by a constant and by adding a multiplied correction signal to the image.

17 Claims, 19 Drawing Sheets

(56) References Cited

U.S. PATENT DOCUMENTS

| | | | |
|---|---|---|---|
| 2007/0103744 A1 | 5/2007 | Chiba | |
| 2008/0170124 A1* | 7/2008 | Hatanaka | G06T 5/004 348/208.4 |
| 2009/0074324 A1* | 3/2009 | Ishiga | H04N 9/045 382/282 |
| 2009/0273690 A1 | 11/2009 | Nashizawa | |
| 2010/0074520 A1 | 3/2010 | Kinoshita | |
| 2011/0205402 A1* | 8/2011 | Kumar | G06T 5/003 348/240.3 |
| 2011/0234858 A1 | 9/2011 | Saito | |
| 2011/0299793 A1* | 12/2011 | Miura | G06T 5/004 382/275 |
| 2012/0002113 A1 | 1/2012 | Nishio et al. | |
| 2012/0014599 A1 | 1/2012 | Kano | |
| 2012/0121202 A1* | 5/2012 | Wang | G06T 5/003 382/255 |
| 2012/0154626 A1 | 6/2012 | Hatakeyama et al. | |
| 2012/0212644 A1 | 8/2012 | Nashizawa | |
| 2013/0010158 A1 | 1/2013 | Watanabe | |
| 2013/0038749 A1 | 2/2013 | Hatakeyama et al. | |

FOREIGN PATENT DOCUMENTS

| | | |
|---|---|---|
| CN | 103259976 A | 8/2013 |
| EP | 1825810 A1 | 8/2007 |
| EP | 2111038 A1 | 10/2009 |
| EP | 2490174 A2 | 8/2012 |
| EP | 2557536 A2 | 2/2013 |
| JP | 2006246080 A | 9/2006 |
| JP | 2007133592 A | 5/2007 |
| JP | 2009268033 A | 11/2009 |
| JP | 2010081263 A | 4/2010 |
| JP | 2010219683 A | 9/2010 |
| JP | 2012235421 A | 11/2012 |
| WO | 2011122284 A1 | 10/2011 |

OTHER PUBLICATIONS

Schuler et al., "Non-stationary Correction of Optical Aberrations", Computer Vision (ICCV), 2011 IEEE International Conference on, IEEE, Nov. 6, 2011, pp. 659-666, XP032101254. Cited in US related U.S. Appl. No. 14/507,207.

European Search Report issued in European application No. 14187886.8, dated Feb. 18, 2015. Cited in US related U.S. Appl. No. 14/507,207.

Kim et al. "Optimal Unsharp Mask for Image Sharpening and Noise Removal", Journal of Electronic Imaging, SPIE/IS & T, vol. 14, No. 2, Apr. 1, 2005, pp. 23005-23001, XP001237090. Cited in European Search Report issued in European counterpart application No. EP14188071.6, dated Feb. 20, 2015.

Loo et al. "Investigation of Basic Imaging Properties in Digital Radiography. 4. Effect of Unsharp Masking on the Detectability of Simple Patterns", Medical Physics, vol. 12, No. 2, Jan. 1, 1985, p. 209, XP0055169486. Cited in European Search Report issued in European counterpart application No. EP14188071.6, dated Feb. 20, 2015.

European Search Report issued in European counterpart application No. EP14188071.6 , dated Feb. 20, 2015.

Office Action issued in Chinese Appln. No. 201410524471.2, mailed Mar. 3, 2016. English translation provided.

Notice of Allowance issued in U.S. Appl. No. 14/507,207 mailed May 9, 2016.

Extended European Search Report issued in EP14188071.6, mailed Jul. 31, 2015.

Office Action issued in Russian Appln. No. 2014140323/28(065310) mailed Apr. 27, 2016. English translation provided.

Office Action issued in Japanese Application No. JP2014-178610 mailed Jun. 21, 2016.

Office Action issued in Japanese Patent Application No. 2014-178610, mailed Nov. 15, 2016.

* cited by examiner

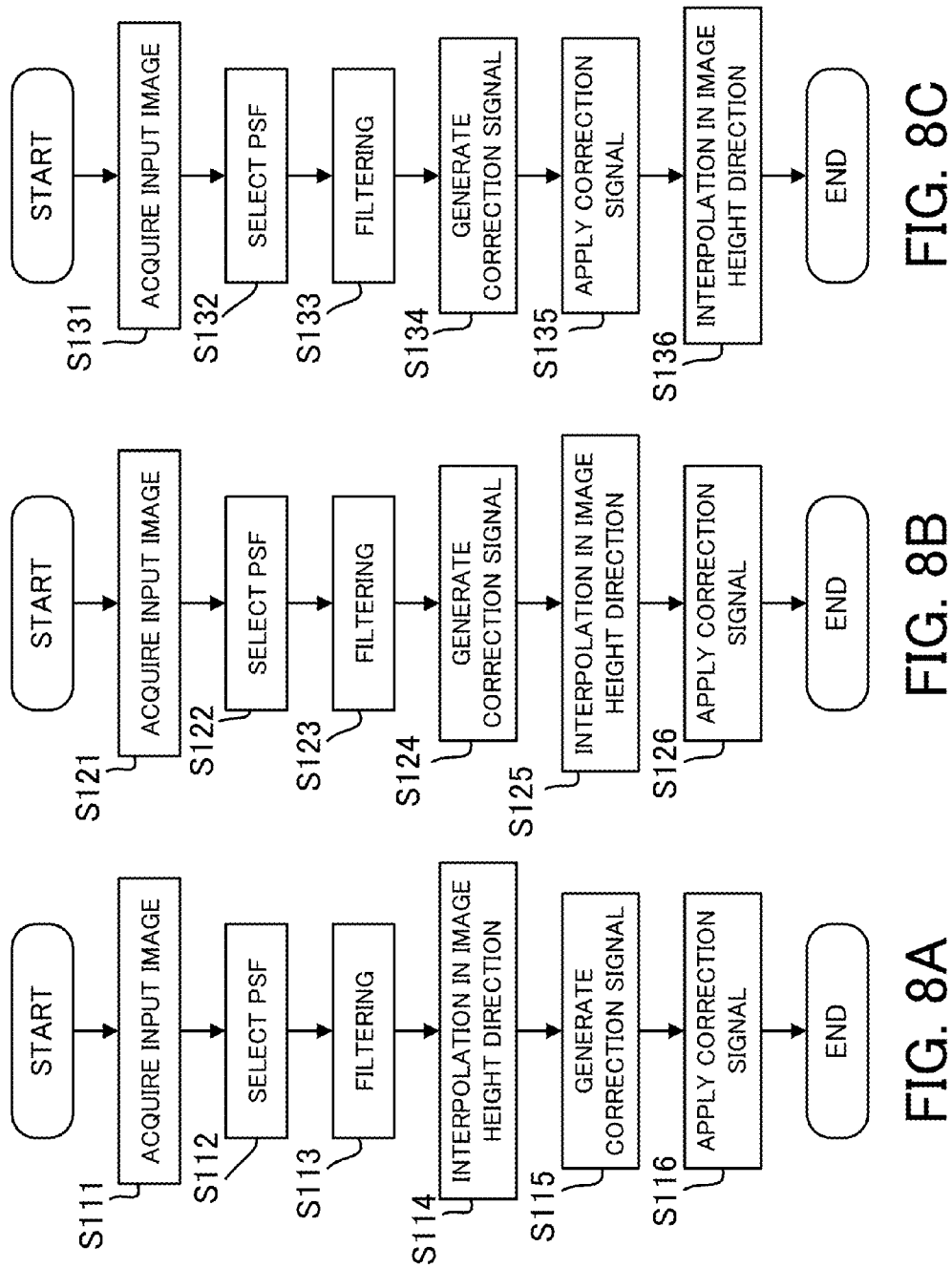

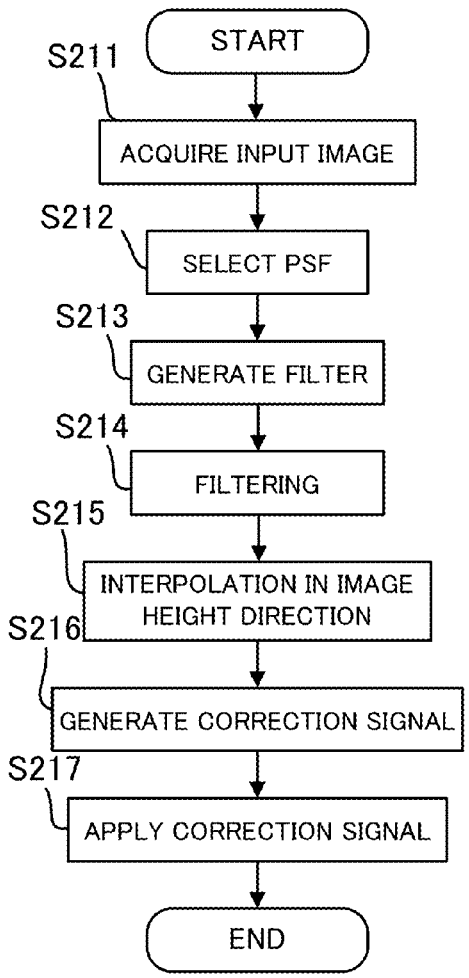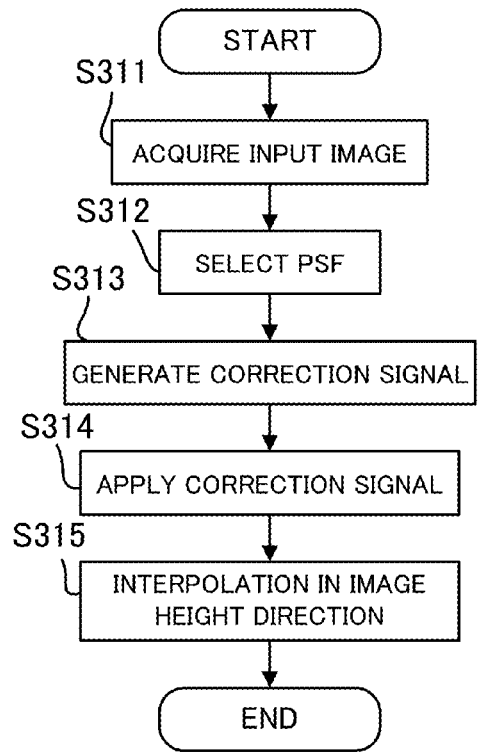
FIG. 12
FIG. 13

LENS ID : No.123
F-NUMBER : F2.8
ZOOM : WIDE
OBJECT DISTANCE : SHORT-DISTANCE

| | IMAGE HEIGHT 1 | IMAGE HEIGHT 2 | IMAGE HEIGHT 3 | | IMAGE HEIGHT 10 |
|---|---|---|---|---|---|
| REAL PART COEFFICIENT | COEFFICIENT<br>c_r1[0][0]<br>c_r1[0][1]<br>c_r1[0][2]<br>c_r1[0][3]<br>.<br>.<br>.<br>c_r1[10][8]<br>c_r1[10][9]<br>c_r1[10][10]<br><br>TAP NUMBER M1 | COEFFICIENT<br>c_r2[0][0]<br>c_r2[0][1]<br>c_r2[0][2]<br>c_r2[0][3]<br>.<br>.<br>.<br>c_r2[10][8]<br>c_r2[10][9]<br>c_r2[10][10]<br><br>TAP NUMBER M2 | COEFFICIENT<br>c_r3[0][0]<br>c_r3[0][1]<br>c_r3[0][2]<br>c_r3[0][3]<br>.<br>.<br>.<br>c_r3[10][8]<br>c_r3[10][9]<br>c_r3[10][10]<br><br>TAP NUMBER M3 | | COEFFICIENT<br>c_r10[0][0]<br>c_r10[0][1]<br>c_r10[0][2]<br>c_r10[0][3]<br>.<br>.<br>.<br>c_r1[10][8]<br>c_r1[10][9]<br>c_r1[10][10]<br><br>TAP NUMBER M10 |
| IMAGINARY PART COEFFICIENT | COEFFICIENT<br>c_i1[0][0]<br>c_i1[0][1]<br>c_i1[0][2]<br>c_i1[0][3]<br>.<br>.<br>.<br>c_i1[10][8]<br>c_i1[10][9]<br>c_i1[10][10]<br><br>TAP NUMBER M1 | COEFFICIENT<br>c_i2[0][0]<br>c_i2[0][1]<br>c_i2[0][2]<br>c_i2[0][3]<br>.<br>.<br>.<br>c_i2[10][8]<br>c_i2[10][9]<br>c_i2[10][10]<br><br>TAP NUMBER M2 | COEFFICIENT<br>c_i3[0][0]<br>c_i3[0][1]<br>c_i3[0][2]<br>c_i3[0][3]<br>.<br>.<br>.<br>c_i3[10][8]<br>c_i3[10][9]<br>c_i3[10][10]<br><br>TAP NUMBER M3 | | COEFFICIENT<br>c_i10[0][0]<br>c_i10[0][1]<br>c_i10[0][2]<br>c_i10[0][3]<br>.<br>.<br>.<br>c_i10[10][8]<br>c_i10[10][9]<br>c_i10[10][10]<br><br>TAP NUMBER M10 |

FIG. 18

IMAGE PROCESSING APPARATUS, IMAGE PICKUP APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to image sharpening processing.

Description of the Related Art

Known unsharp mask processing adds or subtracts a difference between an original image and a blurred image obtained by applying an unsharp mask to the original image (input image) to or from the original image so as to sharpen the image. The image is more sharpened where the difference between the blurred image and the input image is large. Japanese Patent Laid-open No. 2010-81263 discloses a method of reducing the influence of a point spread function (PSF) of an optical system by applying an asymmetric one-dimensional filter to pixel signals arrayed in an image height direction.

However, the conventional unsharp mask processing employs a rotationally symmetric filter as an unsharp mask, and has difficulties in sharpening an image degraded due to the intricately shaped influence of the PSF such as asymmetric aberration and sagittal halo. Specifically, correction of aberration in an azimuth direction having a large aberration causes undershoot in an azimuth direction having a small aberration, whereas suppression of the undershoot results in insufficient correction of the aberration.

The method of Japanese Patent Laid-open No. 2010-81263 takes in account asymmetry only in the image height direction and a correction filter is one-dimensional, and thus cannot improve asymmetries in directions other than the image height direction. The image height direction is a meridional azimuth direction. Moreover, the correction in the image height direction cannot be sufficiently sharpened by the conventional method because the asymmetry of the filter is adjusted by adjusting the number of minus tap coefficients and the filter causes blurring different from that caused by the PSF of the optical system.

As described above, the conventional method cannot sufficiently correct intricately shaped aberration and sharpen an image.

To provide sharpening processing to the input image, image-pickup conditions of the input image and data of point spread function corresponding to the image height are needed. However, previously storing various image-pickup conditions and a large amount of data corresponding to the image height requires a large amount of memory and hence unrealistic.

SUMMARY OF THE INVENTION

The present invention provides an image processing apparatus, an image pickup apparatus, an image processing method, and an image processing program that have excellent sharpening effect.

An image processing apparatus as one aspect of the present invention includes an acquisition unit configured to acquire an image generated by image pickup through an optical system, and a processor configured to provide unsharp mask processing to the image by using a filter generated based on information of a point spread function of the optical system corresponding to an image-pickup condition of the optical system. The filter has two-dimensional data.

An image pickup apparatus as another aspect of the present invention includes an image sensor configured to photoelectrically convert an optical image of an object formed through an optical system, an image processor configured to process an image obtained from the image sensor, and a recorder configured to store a relationship between an image-pickup condition of the optical system and a point spread function of the optical system. The image processor acquires information of a point spread function of the optical system corresponding to an image-pickup condition of the optical system from the recorder, and provides unsharp mask processing to the image by using a filter generated based on information of a point spread function of the optical system. The filter has two-dimensional data.

An image processing method as another aspect of the present invention includes the steps of acquiring an image generated by image pickup through an optical system, and providing unsharp mask processing to the image by using a filter generated based on information of a point spread function of the optical system corresponding to an image-pickup condition of the optical system. The filter has two-dimensional data.

An image processing program as another aspect of the present invention that causes a computer to execute processing including the steps of acquiring an image generated by image pickup through an optical system, and providing unsharp mask processing to the image by using a filter generated based on information of a point spread function of the optical system corresponding to an image-pickup condition of the optical system. The filter has two-dimensional data.

A non-transitory computer-readable storage medium as another aspect of the present invention stores the image processing program.

Further features and aspects of the present invention will become apparent from the following description of exemplary embodiments with reference to the attached drawings.

BRIEF DESCRIPTION OF THE DRAWINGS

FIGS. 8A, 8B, and 8C are flowcharts of an image processing method according to the present invention. (Embodiment 1)

FIG. 12 is a flowchart of an image processing method according to the present invention. (Embodiment 2)

FIG. 13 is a flowchart of an image processing method according to the present invention. (Embodiment 3)

FIG. 18 is a detailed explanatory diagram of the coefficient data according to Embodiment 4.

DESCRIPTION OF THE EMBODIMENTS

Exemplary embodiments of the present invention will be described below with reference to the accompanied drawings.

Prior to specific descriptions of the embodiments, definitions of terms used in the embodiments and image processing will be described.

[Input Image]

An input image is a digital image generated from an output from an image sensor that photoelectrically converts an object image formed by an image pickup optical system (hereinafter, simply referred to as an optical system) in an image pickup apparatus. This digital image is an image degraded by an optical transfer function (OTF) including aberration of an optical system including optical elements such as a lens and an optical filter. The image sensor includes photoelectrically convert elements such as CMOS and CCD. The image pickup optical system may include a curved mirror (reflecting surface). The optical system may be detachable from the image pickup apparatus (interchangeable). In the image pickup apparatus, an image pickup system is constituted by the optical system, the image sensor, and a signal processing circuit that generates the digital image (input image) from the output from the image sensor.

The color components of the input image have, for example, information in RGB color components. The color components to be used may be selected from other generally used color spaces such as a LCH color space that expresses luminance, hue, and saturation, and a YCbCr color space that expresses luminance and color difference. Other applicable color spaces include, for example, XYZ, Lab, Yuv, and JCh color spaces, and color temperature may be used additionally.

Input and output images can have information of an image-pickup condition such as a focal length, an aperture value, and an object distance (hereinafter, referred to as image-pickup condition information) of the optical system in the image pickup apparatus when the input image is generated (captured). The input and output images can further have various correction information used to correct the input image. In a configuration in which the image pickup apparatus outputs the input image to an image processing apparatus separately disposed and the image processing apparatus provides image recovery processing to the input image, the input image desirably has image-pickup condition information and correction information. The image-pickup condition information and the correction information may be, instead of being sent with the input image, directly or indirectly passed from the image pickup apparatus to the image processing apparatus through communications.

[Unsharp Mask Processing (Sharpening Processing)]

Figure 3A:
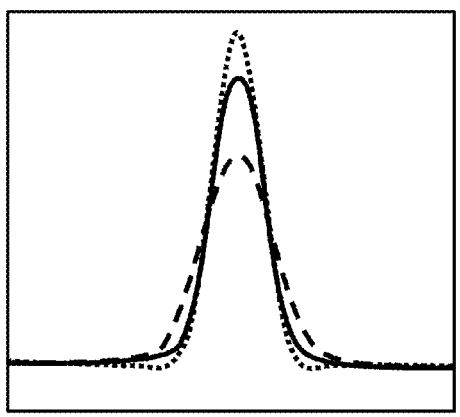
FIGS. 3A and 3B are pattern diagrams of sharpening by unsharp mask processing.
Figure 3B:
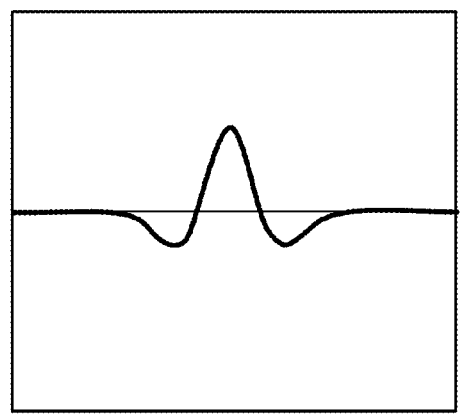

FIGS. 3A and 3B schematically illustrate image sharpening by unsharp mask processing. In FIG. 3A, the solid line represents the input image to be processed, and the long-dotted line (dashed line) represents an image blurred by providing an unsharp mask to the input image. The short-dotted line represents a sharpened image. The solid line in FIG. 3B represents a correction component (correction signal) used for the sharpening. In FIGS. 3A and 3B, the horizontal axis represents a coordinate, and the vertical axis represents a pixel value or a luminance value. FIGS. 3A and 3B each correspond to a section in a predetermined direction (for example, an X direction) in FIGS. 4A and 4B described later.

When the input image is denoted by f(x, y) and the correction component is denoted by h(x, y), a sharpened image g(x, y) can be represented by Expression (1):

$$g(x,y)=f(x,y)+m \times h(x,y) \quad (1)$$

In Expression (1), the correction signal h(x, y) is multiplied by a constant m and added to f(x, y) representing the input image. The constant m can be varied to adjust a correction amount. The constant m may be uniform irrespective of a position in the input image. Alternatively, an adjustment coefficient m(x, y) that varies with the position in the input image may be used to adjust the correction amount depending on the position in the input image. The constant m and the adjustment coefficient m(x, y) may vary depending on the image-pickup condition such as the focal length of the optical system, the aperture value, and the object distance. The constant m is replaceable with the adjustment coefficient m(x, y) in the subsequent description.

When the unsharp mask is denoted by USM, the correction component h(x, y) is represented as below:

$$h(x,y)=f(x,y)-f(x,y)*USM(x,y) \quad (2)$$

Alternatively, the right side of Expression (2) can be rewritten in Expression (3). The USM(x, y) is, for example, a tap value at a coordinates (x, y) of the USM.

$$h(x,y)=f(x,y)*(\delta(x,y)-USM(x,y)) \quad (3)$$

Symbol * represents a convolution (convolution integral, product sum), and symbol δ represents a delta function (ideal point image) whose integral is one. The delta function here is data whose number of taps is equal to that of USM(x, y) and whose value is zero except for a central value of one.

Expression (3) differs from Expression (2) in terms of calculation method used in the processing. However, since Expression (3) can be obtained by rewriting Expression (2), Expression (3) represents an equivalent processing to that of Expression (2). For this reason, Expression (2) is used below to describe generation of the correction component.

Expression (2) calculates a difference between the input image f(x, y) and an image obtained by unsharpening the input image f(x, y) with the unsharp mask USM, and generates the correction component h(x, y). In a typical unsharp mask processing, the unsharp mask USM is a smoothing filter such as a Gaussian filter, a median filter, and a moving average filter. For example, when the Gaussian filter is applied as the unsharp mask USM to the input image f(x, y) illustrated with the solid line in FIG. 3A, an image obtained by unsharpening the input image f(x, y) is illustrated with the long-dotted line in FIG. 3A. The correction component h(x, y) is thus the difference between the input image f(x, y) and the unsharpened image as in Expression (2). Thus, subtracting the signal value of the unsharpened image illustrated with the long-dotted line in FIG. 3A from the signal value of the input image illustrated with the solid line yields the correction component illustrated with the solid line in FIG. 3B. The correction component thus calculated is used to calculate Expression (1) so as to sharpen the input image f(x, y) illustrated with the solid line in FIG. 3A and obtain the image illustrated with the short-dotted line.

Next follows a description of image sharpening through the unsharp mask processing on an optical image of an object degraded through the image forming optical system. When an original image (object image) before passing through the optical system is denoted by I(x, y) and a function PSF representing a response of the optical system to a point light source is denoted by psf(x, y), the input image f(x, y) formed through the optical system is expressed as:

$$f(x,y)=I(x,y)*psf(x,y) \quad (4)$$

If the optical system is a rotationally symmetric coaxial optical system, a PSF corresponding to a central portion of the image is rotationally symmetric. This enables the sharpening processing through which the input image f(x, y) is made closer to the original image I(x, y) at the central portion of the image by applying a rotationally symmetric USM as described above. Since the correction amount is a difference value between the image and an unsharpened image obtained through the unsharp mask processing, a more accurate correction requires the use of an unsharp mask that is shaped more similarly to psf(x, y), not a simple smoothing filter. This is because of the following reason. For example, when an image is degraded due to spherical aberration, which has rotationally symmetric influence, a smoothing filter such as the Gaussian filter has a different distribution shape from that of the PSF affected by the spherical aberration. Thus, the use of the PSF of the optical system enables a more accurate correction in a reduction of rotationally symmetric unsharpening.

For this reason, each embodiment of the present invention uses the PSF as the USM. Although the input image f(x, y) in FIG. 3A used in the description of the unsharp mask processing is illustrated as a symmetrically shaped image for simplifying the description, the shape of the input image may not be symmetric. Even when the original image I(x, y) is shaped asymmetric, a rotationally symmetric degradation function that corresponds to psf(x, y) and functions on the original image I(x, y) achieves sharpening with a rotationally symmetric USM.

Figure 4A:
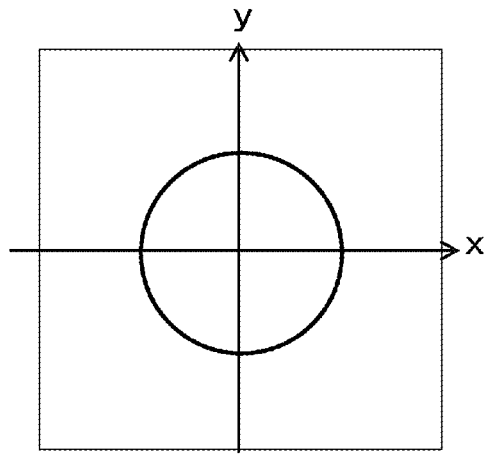
FIGS. 4A and 4B are pattern diagrams of PSF of an image-pickup optical system on an xy plane.
Figure 4B:
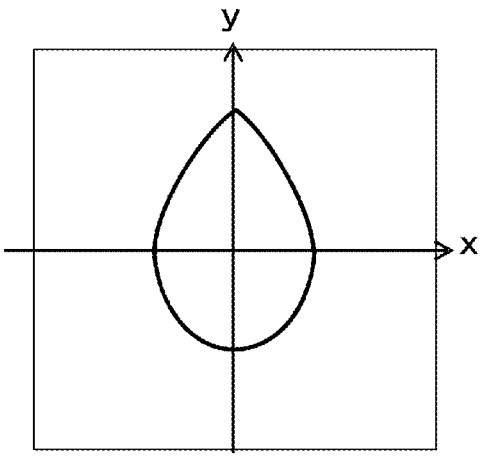

On the other hand, at positions other than the central portion of the image, even when the optical system is a rotationally symmetric coaxial optical system, the PSF is asymmetric in general. FIGS. 4A and 4B schematically illustrate the PSF of the optical system on the xy plane: FIG. 4A illustrates the PSF on the optical axis, and FIG. 4B illustrates the PSF off the optical axis.

For example, if the original image (object image) is an ideal point image, Expression (4) shows that the input image f(x, y) is the PSF of the optical system. When the ideal point image is in an angle of view corresponding to FIG. 4B and the original image (object image) is degraded due to the PSF of the optical system, an image obtained as the input image is a blurred image having the shape illustrated in FIG. 4B. Next follows a description of sharpening through the unsharp mask processing on the image thus asymmetrically blurred.

Figure 5A:
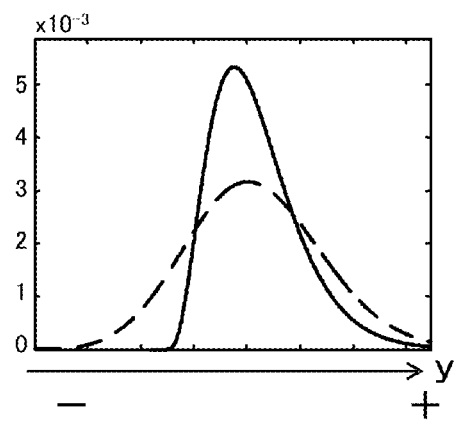
FIGS. 5A and 5B are pattern diagrams of sharpening processing with a rotationally symmetric unsharp mask.
Figure 5B:
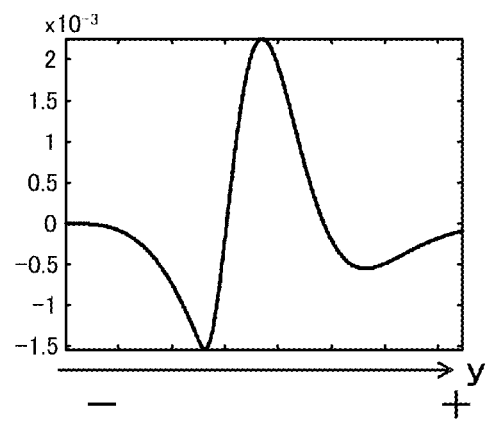
Figure 6A:
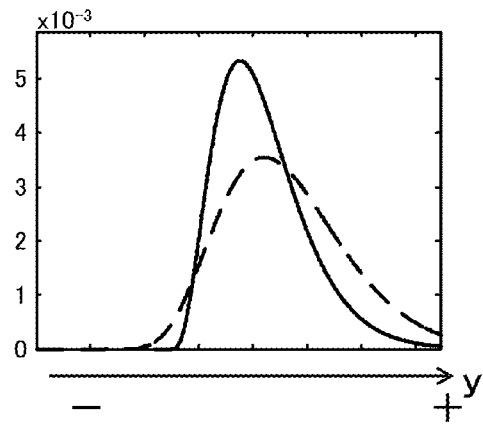
FIGS. 6A and 6B are pattern diagrams of sharpening processing with a rotationally asymmetric unsharp mask.
Figure 6B:
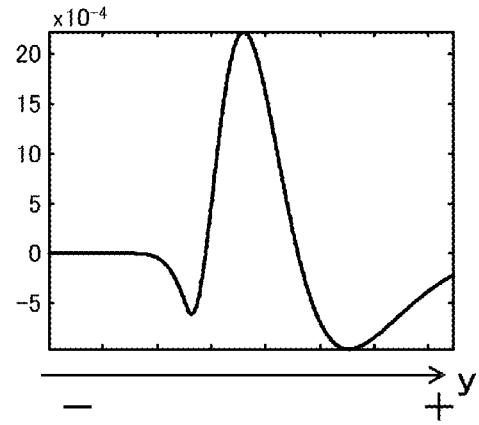

FIGS. 5A and 5B and FIGS. 6A and 6B schematically illustrate the unsharp processing on the asymmetrically degraded image. FIGS. 5A and 5B illustrate the unsharp processing with a rotationally symmetric unsharp mask, and FIGS. 6A and 6B illustrate the unsharp processing with a rotationally asymmetric unsharp mask. The vertical axis and the horizontal axis are the same as those in FIGS. 3A and 3B. Solid lines in FIGS. 5A and 6A represent a section along the y direction in FIG. 4B, and dotted lines represent images obtained by blurring the input image with the respective unsharp masks. The unsharp mask in FIGS. 5A and 5B, that is, the rotationally symmetric unsharp mask, is the Gaussian filter. On the other hand, the unsharp mask in FIGS. 6A and 6B, that is, the rotationally asymmetric unsharp mask, is the PSF of the optical system.

FIGS. 5B and 6B respectively illustrate correction components as differences between the unsharpened images illustrated with the dotted lines in FIGS. 5A and 6A and the original input image. In FIGS. 5A and 6A, the positive Y direction is taken to be a direction toward which the input image blurred by the PSF has an extending skirt. For the case of using the rotationally symmetric unsharp mask illustrated in FIGS. 5A and 5B, the difference between the unsharpened image and the original input image is smaller on the positive side of the peak position of the solid line in FIG. 5A and larger on the negative side thereof. Therefore, the correction component illustrated in FIG. 5B has a higher extreme value (negative value with respect to 0) on the positive side (right side) of the central peak position than that on the negative side (left side).

With the correction component whose correction component amount (correction amount) is smaller on the positive side on which the skirt extends and is larger on the negative side on which the skirt does not extend as illustrated in FIGS. 5A and 5B, asymmetric blurs cannot be corrected through the sharpening represented by Expression (4).

For example, the correction amount is adjusted by changing a constant m in Expression (4) without changing the unsharp mask. However, when a large constant m is used to have a sufficient correction on the positive side of the input image, the negative side of the input image is excessively corrected (undershot). In contrast, when the constant m is set such that the negative side of the input image is appropriately corrected, the positive side of the input image is not sufficiently corrected. This unsharp mask processing with the rotationally symmetric unsharp mask on an asymmetrically blurred input image has difficulties in improving the asymmetry and sharpening the image. Although the embodiment described the case of using the Gaussian filter as the rotationally symmetric unsharp mask, an asymmetrically blurred input image cannot be sufficiently sharpened also with other kinds of rotationally symmetric filters.

Next follows a description of a case of using the rotationally asymmetric unsharp mask illustrated in FIGS. 6A and 6B. In this case, the difference between the unsharpened image and the original input image is larger on the positive side of the peak position of the solid line in FIG. 6A and is smaller on the negative side, which is opposite to the relationship in FIG. 5A. Therefore, the correction component illustrated in FIG. 6B has a higher extreme value on the negative side (left side) of the central peak position than that on the positive side (right side). The correction component applied to the input image illustrated with the solid line in FIG. 6A has a large correction amount on the positive side of the peak position where a large blur exists and a small correction amount on the negative side where a small blur exists. The use of the asymmetric unsharp mask thus causes the blur of the input image and the correction amount of the correction component to have similar distributions, which reduces the excess-and-insufficient correction that occurs with the use of the rotationally symmetric unsharp mask. Moreover, the use of the asymmetric unsharp mask is less likely to cause the excess correction compared to the case of using the rotationally symmetric unsharp mask, and thus the constant m in Expression (4) can be set relatively large, thereby reducing the asymmetry and sharpening the image further.

Since the correction amount of the correction component is distributed in the same manner with the difference between the unsharpened image and the original image, a portion largely blurred by the PSF of the image-pickup optical system needs to be more blurred by the unsharp mask as compared to other portions in order to achieve a more accurate correction. Thus, the PSF of the optical system is ideally used as the unsharp mask for the more accurate correction. The section described in the embodiment is one-dimensional, but may be two-dimensional.

Next follows a description of a filter and a correction signal used in each embodiment described later, and the unsharp mask processing according to each embodiment.

In Embodiments 1 and 4, the sharpening is provided using Expression below derived from Expressions (1) and (2).

$$g(x,y)=f(x,y)+m\times\{f(x,y)-f(x,y)*USM(x,y)\} \quad (5)$$

In Embodiment 2, the sharpening is provided using Expression below derived from Expressions (1) and (3).

$$g(x,y)=f(x,y)+m\times f(x,y)*\{\delta(x,y)-USM(x,y)\} \quad (6)$$

In Embodiment 3, the sharpening is provided using Expression below transformed from Expression (6).

$$g(x,y)=f(x,y)*\{\delta(x,y)+m\times(\delta(x,y)-USM(x,y))\} \quad (7)$$

Expression (7) can be transformed to Expression below.

$$g(x,y)=f(x,y)*\{(1+m)\times\delta(x,y)-m\times USM(x,y)\} \quad (8)$$

In Embodiment 3, the sharpening is provided using Expression (7) but may be provided using Expression (8).

[Held Data]

The PSF of the optical system needs to be stored in the image pickup apparatus and the image processing apparatus so as to be used as the unsharp mask as described above. The PSF stored in these apparatuses can be directly used as the USM in the sharpening processing. However, the PSF differs depending on conditions (image-pickup conditions) when the input image is captured and an image height, and thus data corresponding to different PSFs needs to be stored to provide accurate correction processing. Furthermore, these PSFs are two-dimensional and a color image requires data for each of the color components such as RGB.

The held data may store information of the OTF for producing the PSF or information of the PSF selectively as appropriate. First, the case of storing information of the OTF will be described below.

Conversion from the OTF to the PSF requires a Fourier transform, which is not a heavy load nowadays owing to an improved processing speed of a recent calculation processing apparatus.

However, the OTF data for each image height is data for the number of taps in a longitudinal direction×the number of taps in a lateral direction×2 (the real part and the imaginary part)×3 (RGB). Storing, in the apparatuses, all image-pickup conditions such as an image height, an F number (aperture value), a zoom position (focal length), and an object distance (object distance) results in an increased amount of data. As described above, highly accurate processing and the amount of data are incompatible in general, but the embodiments provide a highly accurately corrected image from a small amount of data. The OTF has relatively broad frequency characteristics as described in the embodiments later, which enables a highly accurate fitting by a function such as a polynomial. Thus, fitting coefficients of the function are data to be held, which leads to a significantly reduced amount of data to be held compared to two-dimensional data held for the OTF.

When the image pickup apparatus is lens interchangeable, since the pixel pitch of the image sensor differs depending on the model of the image pickup apparatus, the PSF data differs for the same lens. As described in the embodiments, the pixel pitch and the number of taps of the PSF to be generated can be changed easily when a function and its coefficient data for regenerating the OTF are held in the apparatus.

Next follows a description of storing information of the PSF as the held data. Information of the PSF to be held is, similarly to the case of the OTF, PSF data corresponding to the image pickup conditions and the color components. Alternately, instead of storing two-dimensional PSF data, the PSF may be approximated to a function through a fitting, and its coefficients for reproducing the PSF may be held as the held data. Using a function appropriate for approximation of the PSF can reduce the amount of data for the PSF through approximation to the function. Similarly to the approximation of the OTF to a function, storing a function for reproducing the PSF and its coefficient data enables reproduction of the pixel pitch and the number of taps of the PSF to be reproduced. Information of the PSF thus stored eliminates the need to provide a Fourier transform, leading to a reduced processing load.

The PSF differs for each image-pickup condition including the image height of an image formed through the optical system and the focal length, the F-number, and the object distance of the optical system. The embodiments below describe the image height as an exemplary image-pickup condition, but aberration information different for each of the focal length, the F-number, and the object distance of the optical system may be acquired so as to generate an unsharp mask based on the information.

Embodiment 1

Figure 1:
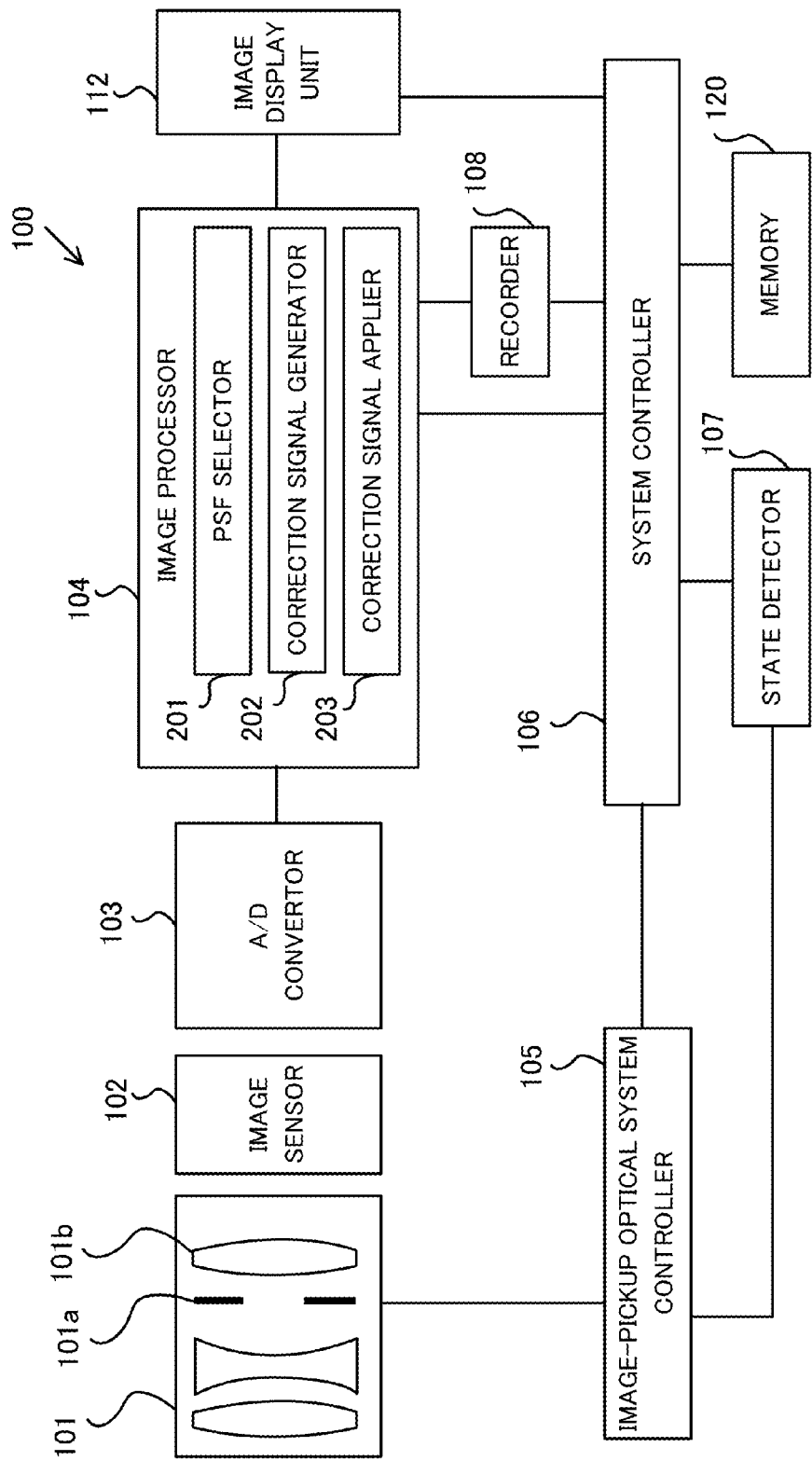
FIG. 1 is a block diagram of an image pickup apparatus according to each of Embodiments 1, 2, and 3 of the present invention.

FIG. 1 is a block diagram of an image pickup apparatus 100 according to Embodiment 1. In the image pickup apparatus 100, a program that provides sharpening processing (an image processing method) to an input image is installed in a memory 120, and the sharpening processing is executed by an image processor 104 (image processing apparatus) of the image pickup apparatus 100. The memory 120 is constituted by a ROM and a hard disk drive, but a recorder 108 described later may be used as the memory.

The image pickup apparatus 100 includes an image-pickup optical system 101 (lens) and an image pickup apparatus body (camera body). The image-pickup optical system 101 includes an aperture stop 101a and a focus lens 101b, and is integrally configured with the image pickup apparatus body. However, this embodiment is not limited thereto and also applicable to an image pickup apparatus including an image pickup apparatus body mounted with an interchangeable image-pickup optical system 101.

The image sensor 102 is a two-dimensional image sensor such as a CCD (charge coupled device) or a CMOS (complementary metal-oxide semiconductor). The image sensor 102 photoelectrically converts an object image (imaging light) obtained through the image-pickup optical system 101 and generates an image. The object image is photoelectrically converted into an analog signal (electric signal) by the image sensor 102. This analog signal is converted by an A/D convertor 103 into a digital signal that is then input to the image processor 104.

The image processor 104 is an image processing unit that provides predetermined unsharp mask processing as well as predetermined processing to this digital signal. In this embodiment, the sharpening processing is provided by the image processor of the image pickup apparatus, but may be provided by a personal computer (PC) or a dedicated apparatus serving as the image processing apparatus.

The image processor 104 acquires image-pickup condition information of the image pickup apparatus 100 from a state detector 107. The image-pickup condition information is information of the aperture, the object distance, and the focal length of a zoom lens. The state detector 107 acquires the image-pickup condition information directly from a system controller 106, but is not limited thereto. For example, the image-pickup condition information of the image-pickup optical system 101 may be acquired from an image-pickup optical system controller 105.

Subsequently, the image processor 104 provides image sharpening processing to the input image. The image processor 104 includes a point image intensity distribution selector (PSF selector) 201, a correction signal generator 202, and a correction signal applier 203. However, when the image processor 104 serves as the image processing apparatus, the system controller 106 of the image pickup apparatus 100 may store aberration information in association with the image. In this case, the image processing apparatus may include the correction signal generator 202 and the correction signal applier 203 but not the PSF selector 201.

An output image processed at the image processor 104 is stored in a predetermined format in the recorder 108. The recorder 108 also serves as a memory that stores a relationship between image-pickup conditions of the image-pickup optical system 101 and the PSF of the image-pickup optical system.

An image display unit 112 is capable of displaying an image provided with predetermined display processing after the image sharpening processing. The image display unit 112 may display an image provided with simplified processing so as to achieve fast display.

These series of processing are controlled by the system controller 106. The system controller 106 is configured as a micro computer and a CPU (processor). Mechanical drive of the image-pickup optical system 101 is controlled by the image-pickup optical system controller 105 based on a command from the system controller 106.

The image-pickup optical system 101 may include optical elements such as a low-pass filter and an infrared cut filter. When an optical element that has influence on the PSF characteristics, such as a low-pass filter, is used, counting the influence of the optical element at manufacturing an unsharp mask enables more highly accurate image sharpening processing. When an infrared cut filter is used that has influence on the PSF of each of the RGB channels (RGB color components) that is an integrated value of the PSF over spectral wavelengths, especially on the PSF of the R channel, the influence of the optical element is desirably counted at manufacturing of an unsharp mask.

Figure 2:
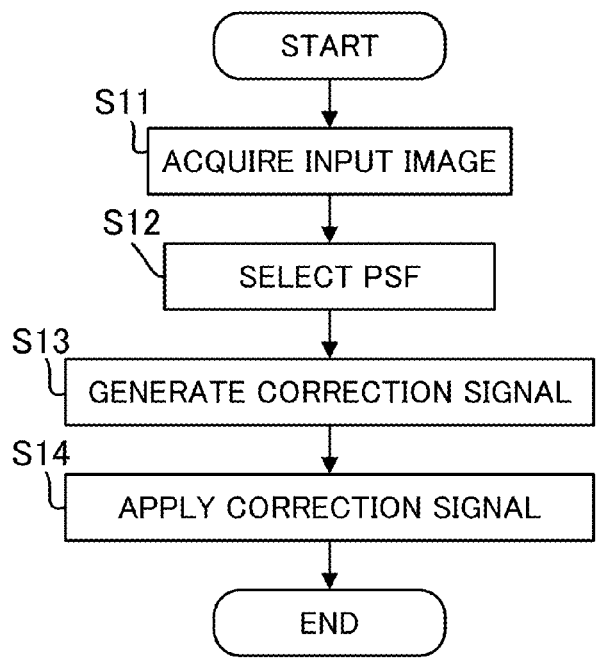
FIG. 2 is a flowchart of an image processing method according to each of Embodiments 1, 2, and 3.

Next follows a description of the image processing method according to this embodiment with reference to FIG. 2. FIG. 2 is a flowchart illustrating the whole process in this embodiment, where "S" represents "step (process)". The flowchart illustrated in FIG. 2 is realizable as a program (image processing program) that causes a computer to execute the function of each step. The other flowcharts are also realizable in the same manner. Each step in FIG. 2 is executed by the image processor 104 based on a command from the system controller 106.

First, an image is acquired as an input image (S11), and subsequently the PSF selector 201 acquires, from the recorder 108, the PSF of the image-pickup optical system corresponding to image-pickup conditions of the input image (acquiring step S12). Information of the PSF acquired by the PSF selector 201 may be two-dimensional tap data, a plurality of one-dimensional tap data as components of the PSF, and coefficients.

Next, the correction signal generator 202 generates an unsharp mask and a correction signal based on the information of the PSF acquired at S12 (generating step S13).

Figure 7A:
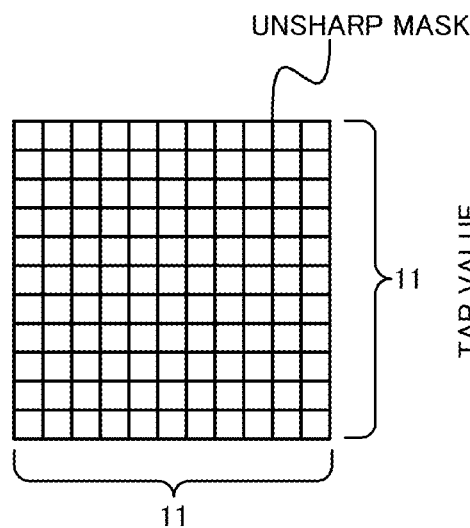
FIGS. 7A and 7B are a pattern diagram and a schematic cross-sectional view of an unsharp mask.
Figure 7B:
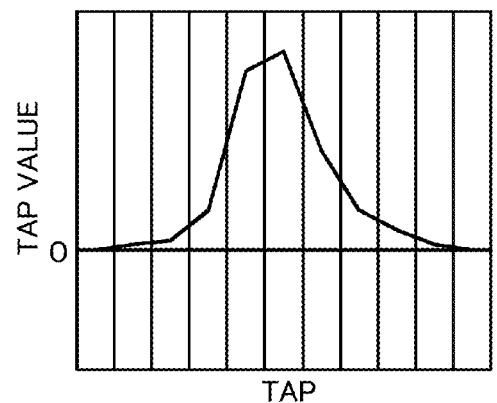

The unsharp mask will be described here with reference to FIGS. 7A and 7B. The unsharp mask has the number of its taps determined depending on aberration characteristics of the image-pickup optical system and a required sharpening accuracy. An unsharp mask in FIG. 7A is an exemplary two-dimensional mask of 11×11 taps. FIG. 7A omits a value (coefficient) in each tap, and FIG. 7B illustrates a section of the unsharp mask. In FIG. 7B, the horizontal axis represents the taps, and the vertical axis represents the values of the taps.

The distribution of the values (coefficient values) of the taps of the unsharp mask is ideally the distribution of signal values (the PSF of the image-pickup optical system) that is spread due to aberration. The unsharp mask may be generated based on the information of the PSF as described above or may be the PSF acquired by the PSF selector 201. The processing of generating the correction signal by using the unsharp mask generated at the correction signal generator 202 will be described later.

Next, the correction signal applier 203 provides the sharpening processing to the input image by using the correction signal generated at S13 (sharpening step S14). The details of the processing at S14 will be described later.

FIG. 8A is a flowchart illustrating the details of the processing according to this embodiment. Each step in FIG. 8A is executed by the image processor 104 based on a command from the system controller 106.

First, an image is acquired as an input image (S111). Specifically, color component data as a correction target used as the input image is, for example, image data of the G channel after demosaicing. However, the color component data may be image data of the R channel or the B channel, image data of all RGB channels, or image data before demosaicing.

Figures 9, 10:
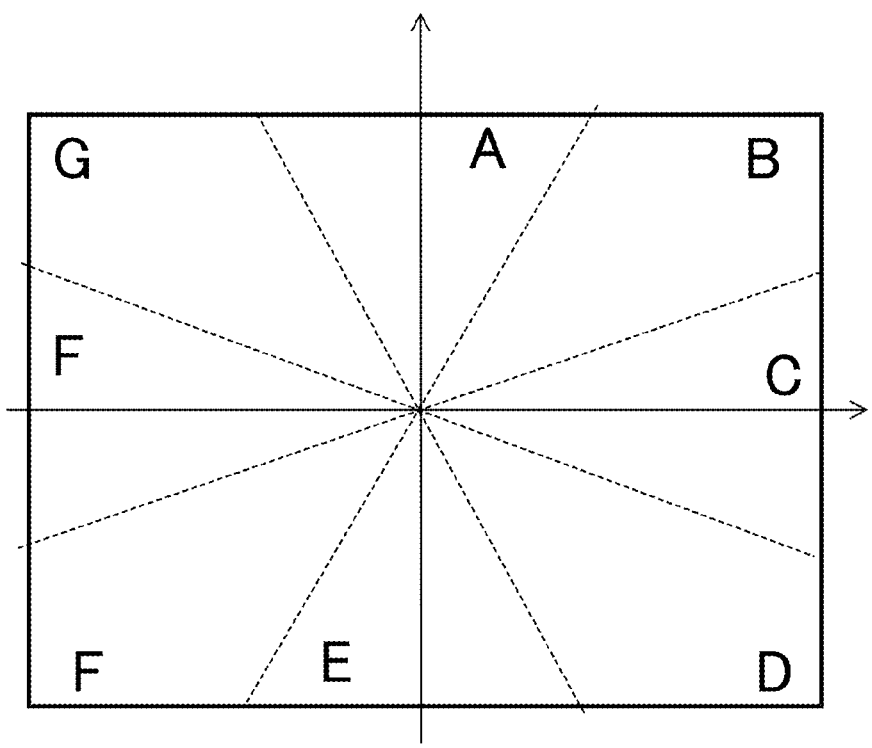
FIG. 9 is a pattern diagram of a Bayer array.
FIG. 10 is an explanatory diagram of a method of dividing an input image.

FIG. 9 is a pattern diagram of a Bayer array that is a discrete ordered array. For example, the processing may be provided to the input image that is data of each channel of RGB or that is data of a particular channel. Alternatively, as illustrated in FIG. 9, the G channel may be divided into G1 and G2, which provides four channel in total. With the configuration where the G channel is divided into two as described above, the image data for each of R, G1, G2, and B has the same resolution, which facilitates image processing and data processing.

Next, the PSF selector 201 acquires, from the recorder 108, the information of the PSF of the image-pickup optical system corresponding to the input image (S112). The information of the PSF acquired by the PSF selector 201 may be two-dimensional tap data, a plurality of one-dimensional tap data as components of the PSF, and coefficients. The two-dimensional data is decomposed into a plurality of one-dimensional data by, for example, the singular value decomposition theorem. The main component divided by such a theorem may be recorded in the recorder 108, and these one-dimensional tap data corresponding to the main component of the PSF may be acquired from the recorder 108 depending on image-pickup conditions.

Since the PSF varies with the image height, the unsharp mask is desirably varied depending on the image height so as to improve a correction accuracy, but recorded data in the recorder 108 leads to an increased cost. For this reason, in this embodiment, in order to allow the unsharp mask to vary with the image height, the input image is divided into a plurality of regions and interpolation processing is performed based on information of the PSF for at least two image heights for each region, thereby generating an intermediate unsharp mask. The details of the interpolation method will be described later for S114.

Next follows a description of the division of the input image into the regions. FIG. 10 is a pattern diagram of the input image, where the long-side and short-side directions of the input image are respectively taken to be an X direction and a Y direction, and the center of the image is taken to be the origin of the coordinates. In this embodiment, as illustrated in FIG. 10 as an example, the input image is divided into eight regions A to G, and information of a point spread function is acquired for each of peripheral portions of the regions and the origin.

Next, the correction signal generator 202 provides filtering processing using the PSF acquired at S112 (S113). In this embodiment, the PSF is used as the unsharp mask, and convolution processing (convolution integral, product sum) with the unsharp mask is provided to the input image. Since the number of the PSFs acquired at S112 is nine in total including the eight surrounding regions and the origin, nine input images blurred with the corresponding unsharp masks, that is, nine image data filtered through the unsharp mask, are generated.

Next, the correction signal generator 202 provides interpolation processing in the image height direction using a plurality of image data filtered by the unsharp masks, which are generated at S113, and generates one image data filtered by the unsharp masks (interpolation step S114).

Figure 11:
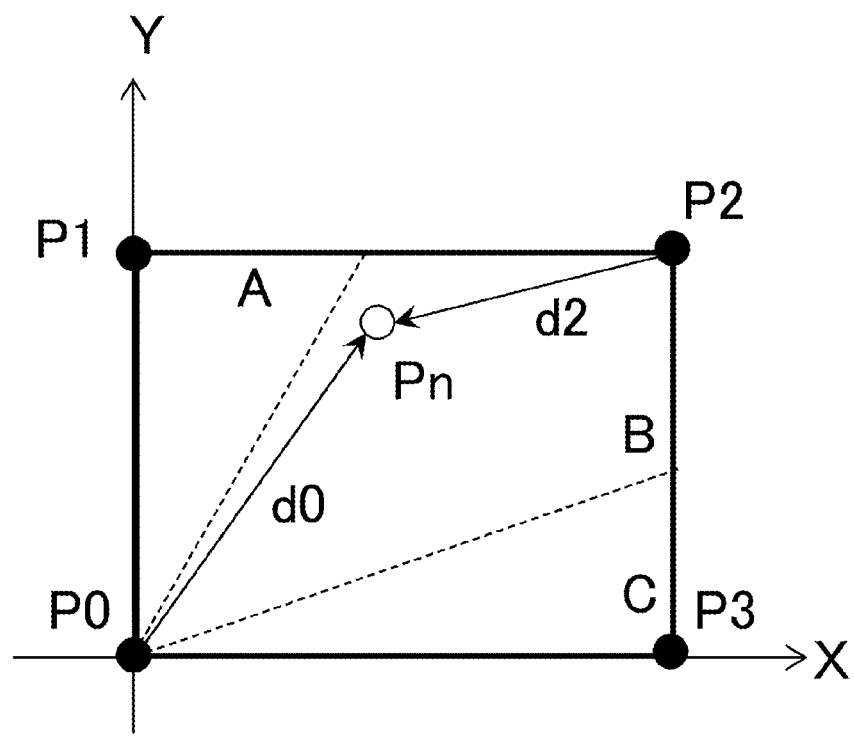
FIG. 11 is an explanatory diagram of a method of interpolating the input image in an image-height direction.

Next follows a description of the interpolation processing in the image height direction with reference to FIG. 11. In FIG. 11, the directions of regions C and A with respect to the origin are respectively taken to be the positive X direction and the positive Y direction, and thus FIG. 11 illustrates the first quadrant of the input image where the X axis and the Y axis are both positive. In FIG. 11, P0 denotes the origin, and P1, P2, and P3 respectively denote peripheral image points of region A, region B, and region C, and the PSF selector 201 acquires the PSF for each of the image points P0 at S112, P1, P2, and P3.

In FIG. 11, point Pn illustrated with a white dot represents an optional point (image point) in the image, point Pn in region B uses data of the input image filtered through the unsharp mask generated based on information of the PSFs of points P0 and P2 at S113. Similarly, points Pn in regions A and C respectively use data of the input image filtered at S113 through unsharp masks corresponding to image heights at points P0 and P1 and at points P0 and P3.

Next follows a description of generation of interpolation data corresponding to the filtered data at an optional point Pn from two image heights in a region. As illustrated in FIG. 11, point Pn in region B is at distance d0 from the origin P0 and at distance d2 from point P2. When the input images filtered at S113 based on the PSFs corresponding to points P0 and P2 are denoted by F0 and F2, interpolation data Fn corresponding to an optional point Pn is represented by Expression below.

$$Fn = F0 \times (1-d0) + F2 \times d2 \qquad (9)$$

Such interpolation processing generates interpolation data at an optional image height in each region and one image data based on a plurality of image data generated at S113. Image data thus generated is less than data of an input image filtered using different PSFs depending on image heights, thereby leading to an improved processing speed.

Although Expression (9) is for region B in the first quadrant, similar calculations for other regions and other quadrants can generate interpolated data. The image height interpolation may be performed not only by Expression (9) but also by a quadratic curve, or each filtered input image may be weighted by constant multiplication.

Next, the correction signal generator 202 generates the correction signal based on the interpolation data generated at S114 (S115). In this embodiment, the correction component is represented by Expression (2) and is generated based on a difference between the input image and the interpolation data generated at S114.

Next, the correction signal applier 203 applies the correction signal generated at S115 to the input image and sharpens the image (S116). In this embodiment, the application of the correction signal corresponds to Expression (1), in which the constant m is determined based on image noise and excess or insufficient correction of the sharpening. The thus determined constant m, the correction signal generated at S115, and the input image are used to provide the sharpening processing.

Expression (1) is expressed as an addition of the first term and the second term for a positive constant m and a subtraction thereof for a negative constant m. Thus, when the correction signal is applied to the input image in the sharpening processing in this embodiment, the application is expressed in the addition or the subtraction depending on the sign of the constant m. However, since the addition and subtraction are understood as merely a difference of signs and essentially mean the same, the calculation may be the addition or the subtraction depending on the sign of the constant m. In this embodiment, since the PSF of the image-pickup optical system is used as the unsharp mask, an input image having degradation at its peripheral portions due to an asymmetric PSF of the image-pickup optical system can still be accurately corrected and sharpened.

In this embodiment, the interpolation in the image height direction is provided to the filtered image, but may be provided to the correction signal (FIG. 8B) and a sharpened image (FIG. 8C).

In the process illustrated in FIG. 8B, the point spread functions are acquired for at least two image heights in each of a plurality of regions set in the input image, and a plurality of correction signals are generated based on the point spread functions. Then, the correction signals are interpolated in the image height direction so as to generate one correction signal that is then applied to sharpen the input image. In the process illustrated in FIG. 8C, the point spread functions are acquired for at least two image heights in each of a plurality of regions set in the input image, and a plurality of correction signals are generated based on the point spread functions. Then, the correction signals are each applied to the input image so as to acquire a plurality of sharpened images that are then interpolated in the image height direction so as to generate one sharpened image.

FIG. 8B is a flowchart illustrating a detailed flow of the processing of providing the interpolation processing in the image height direction after generating the correction signals. S121, S122, and S123 respectively corresponds to S111, S112, and S113. Next will be a description of the processing at S124 and S125 in FIG. 8B corresponding to but different from the processing at S114 and S115 in FIG. 8A.

At S124, the correction signal generator 202 generates the correction signals from filtered data obtained by filtering the input images by the unsharp masks at S123. The correction signals are generated from the difference between the input image and the filtered data through Expression (2). These correction signals are generated in the amount of the data generated at S123.

Next, at S125, the correction signal generator 202 provides the interpolation processing in the image height direction based on the correction signals generated at S124. The interpolation processing at S125 is provided to a different interpolation target from that of the interpolation processing at S114, but the flow of processing in general is the same as that of the interpolation processing at S114. At S114, data of the input image convolved with the PSF acquired at S112 as the unsharp mask is interpolated in the image height direction.

On the other hand at S125, a difference between the input image and the data of the input image convolved with the unsharp mask is used as a correction signal, and the interpolation processing in the image height direction is performed with the correction signal. The processing at S114 interpolates f(x, y)*USM in Expression (2) in the image height direction, whereas the processing at S125 interpolates h(x, y) in the image height direction.

Thus, with data of f(x, y)*USM at S114 replaced with data of h(x, y), the interpolation processing at S125 is provided to the correction signals in the image height direction. The correction signals thus interpolated are applied to the input image by the correction signal applier 203 at S126. The application of the correction signals at S126 is similar to the processing at S116, and thus is not described below in detail.

Next follows a description of the flow of the interpolation processing in the image height direction on the input image to which the correction signals have been applied, with reference to FIG. 8C. S131, S132, S133, and S134 respectively correspond to S121, S122, S123, and S124.

The processing at S135 and S136, which is different from the processing at S125 and S126 in FIG. 8B, will be described. At S135, the correction signal applier 203 provides sharpening processing to the input image based on the correction signals generated at S134. At S134, the correction signals are generated in the amount of a plurality of unsharp masks generated from PSFs selected at S132. The sharpening processing at S135 applies, based on Expression (1), the correction signals generated at S134 to the input image.

Next, at S136, a plurality of sharpened images generated at S135 are interpolated in the image height direction. The interpolation processing at S136 is provided to a different interpolation target from that of the interpolation processing at S114 or S125, but the flow of processing in general is the same as that of the interpolation processing at S114 or S125. The processing at S125 interpolates h(x, y) in Expression (1) in the image height direction, whereas the processing at S136 interpolates g(x, y) in the image height direction. Thus, with data of h(x, y) at S125 replaced with data of g(x, y), the processing at S136 interpolates sharpened images in the image height direction.

Embodiment 2

An image pickup apparatus according to Embodiment 2 has the same configuration as that of the image pickup apparatus according to Embodiment 1. Embodiment 2 differs from Embodiment 1 in that an image processing method illustrated in FIG. 12 is used in place of the image processing methods illustrated in FIGS. 8A-8C. FIG. 12 is a flowchart of the image processing method according to Embodiment 2, and each step is executed by the image processor 104 based on a command from the system controller 106.

This embodiment uses a different method of generating correction signals from that in Embodiment 1. The processing at S211 and S212 is the same as that at S111 and S112. Although Embodiment 1 generates correction signals based on Expression (2), this embodiment generates correction signals based on Expression (3). To generate correction signals, the correction signal generator 202 according to this embodiment first calculates a difference between an ideal point image and PSFs selected by the PSF selector 201 and generates filters (S213). Next, the correction signal generator 202 convolves the input image with the generated filters to generate correction signals (S214). The processing at S215, S216, and S217 are the same as that at S114, S115, and S116, and thus their descriptions are omitted. In this way, the sharpening processing based on Expression (6) can be executed.

The interpolation in the image height direction may be provided to correction signals as described in Embodiment 1, or may be provided to the input image sharpened with the correction signals.

Embodiment 3

An image pickup apparatus according to Embodiment 3 has the same configuration with that of the image pickup apparatus according to Embodiment 1. Embodiment 3 differs from Embodiment 1 in that an image processing method illustrated in FIG. 13 is used in place of the image processing methods illustrated in FIGS. 8A-8C. FIG. 13 is a flowchart of the image processing method according to Embodiment 3, and each step is executed by the image processor 104 based on a command from the system controller 106.

This embodiment uses a different method of generating correction signals and a different method of applying the correction signals from those in Embodiments 1 and 2, and this embodiment generates filters based on Expression (7) and applies the generated filters to the input image. Thus, the flowchart in FIG. 13 differs from those in Embodiment 1 and 2 at generating filters at S313 and applying the filters at S314. The processing at S311 and S312 is the same as that at S111 and S112.

This embodiment uses PSFs selected at S312 as unsharp masks so as to generate filters corresponding to the term in the curly brackets in Expression (7) (S312). In this embodiment, correction signals generated by the correction signal generator 202 are filters. Next, the correction signal applier 203 convolves the input image with the filters generated at S313 so as to sharpen the image (S314). In the sharpening processing according to this embodiment, the sharpening is provided by convolving once the image with the filters (correction signal) generated based on the PSFs of the image-pickup optical system as the unsharp masks.

Each of the embodiments provides the image processing apparatus, the image pickup apparatus, the image processing method, and the image processing program that have high sharpening effects.

Embodiment 4

Figure 14:
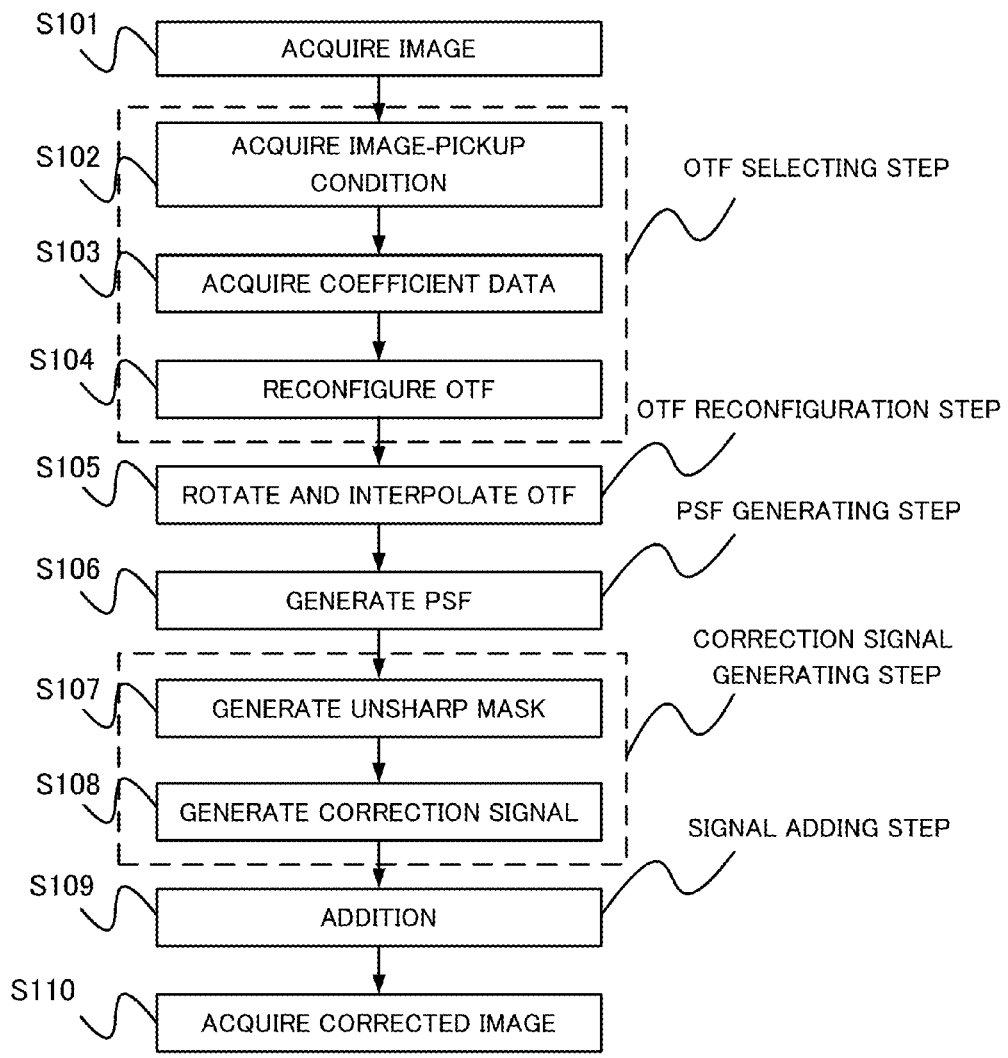
FIG. 14 is a flowchart of the image processing method according to Embodiment 1 of the present invention.

FIG. 14 is a flowchart of the procedure of an image processing method according to Embodiment 4 of the present invention. This image processing method is executed by a computer (processor) that is mounted onto the image pickup apparatus or is an image processing apparatus in accordance with an image processing program as a computer program.

At S101, the computer acquires, as the input image, a digital image captured and generated by the image pickup apparatus through the optical system. If the computer is mounted onto the image pickup apparatus, the computer acquires the input image from the image pickup system. If the computer is another image processing apparatus different from the image pickup apparatus, the computer acquires the input image from the image pickup apparatus through wired or wireless communication or via a non-transitory computer-readable storage medium. Data used as the input image is, for example, image data of the G channel after demosaicing. However, image data of the R channel or the B channel may be used as the input image, or image data of each of the RGB channels may be used as the input image. Alternatively, image data before demosaicing may be used as the input image.

FIG. 9 illustrates an pixel array of the input image, which is the same as that in Embodiment 1, and thus its description is omitted.

Next, at S102, the computer acquires the image-pickup condition information. The image-pickup conditions include, as described above, the focal length, the aperture value, and the object distance. If the input image generated in a lens interchangeable image pickup apparatus, the image-pickup conditions include a lens ID unique to the lens and a camera ID unique to the image pickup apparatus. The image-pickup conditions may be directly acquired from the image pickup apparatus or may be acquired as information with the input image.

Next, at S103, the computer acquires coefficient data appropriate for the image-pickup conditions. The coefficient data is used to reconfigure OTFs and can be selectively acquired from data previously stored in a memory, a server, or a network, depending on the image-pickup conditions. Coefficient data corresponding to an image-pickup condition between image-pickup conditions whose coefficient data for the aperture, the object distance, and the focal length of a zoom lens is stored may be generated through the interpolation processing based on the stored coefficient data. This can reduce the amount of previously stored coefficient data. The interpolation processing method may be, but not limited to, a well-known bilinear interpolation (linear interpolation) or bicubic interpolation, for example.

Next, at S104, the computer uses the coefficient data appropriate for image-pickup conditions so as to reconfigure (generate), in a particular image height direction, a plurality of different optical transfer functions that each vary with the image height from a reference position that is the center of the input image or the optical axis of the optical system. The reconfiguration of the optical transfer functions based on selected coefficient data is equivalent to the selection of the optical transfer functions. The processing at this step will be described later in detail. In this embodiment, steps S102 to S104 are referred to as an optical transfer function selecting step.

Next, at S105, the computer rotates the reconfigured optical transfer functions around the center of the input image or the reference position as the optical axis of the optical system. The computer then interpolates the optical transfer functions for a pixel array of the input image (or the image sensor of the image pickup apparatus that acquired the input image). In this manner, the computer obtains optical transfer functions corresponding to a plurality of particular two-dimensional discrete positions in the input image, and two-dimensionally arranges the optical transfer functions for the input image. These two-dimensionally arranged optical transfer function are hereinafter referred to as the rearranged optical transfer functions. In this embodiment, the processing at S105 is referred to as the optical transfer function rearranging step.

Next, at S106, the computer converts the rearranged optical transfer functions into point spread functions. The conversion from the optical transfer functions into the point spread functions is performed through an inverse Fourier transform. In this embodiment, the processing at S106 is referred to as the point spread function generating step.

Figure 15A:
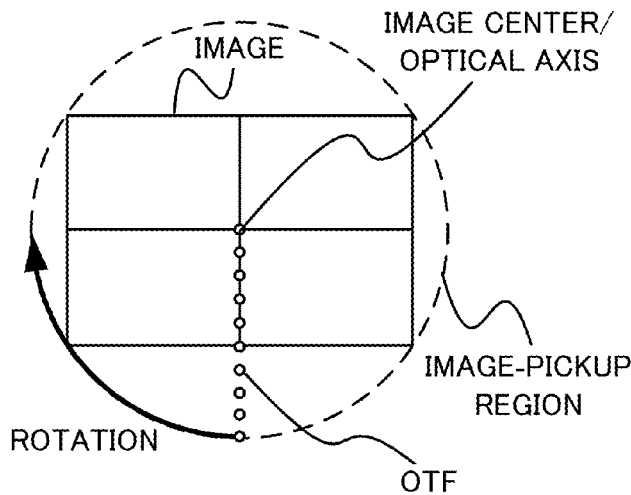
FIGS. 15A, 15B, 15C, 15D, and 15E are explanatory diagrams of arrangements of OTFs and PSFs according to Embodiment 4.
Figure 15C:
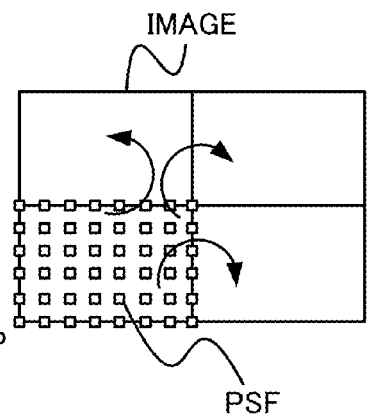
Figure 15B:
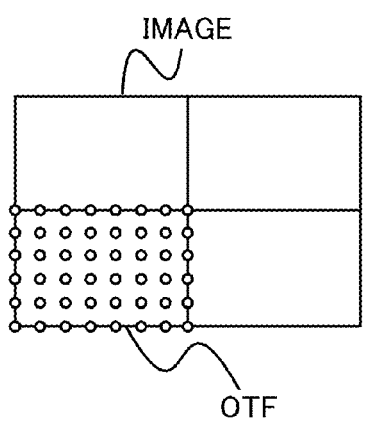

Next follows a detailed description of the processing at S104 to S106 with reference to FIGS. 15A to 15E. In FIG. 15A, circles represent optical transfer functions (hereinafter, referred to as the OTFs) reconfigured at S104. The reconfigured OTFs respectively correspond to a plurality of image heights in a particular image height direction (the longitudinal direction in FIG. 15A) with respect to the reference position in the region (image-pickup region) of a circumcircle of the input image. At S105, the computer rotates the OTFs in the particular image height direction around the reference position, and provides the interpolation appropriate for the pixel array of the input image so as to two-dimensionally arrange (in the longitudinal direction and the lateral direction) the OTFs on the input image as illustrated in FIG. 15B. The interpolation involves radial-directional and rotational interpolations, which enables arrangement of the OTFs at optional pixel positions.

Figure 15D:
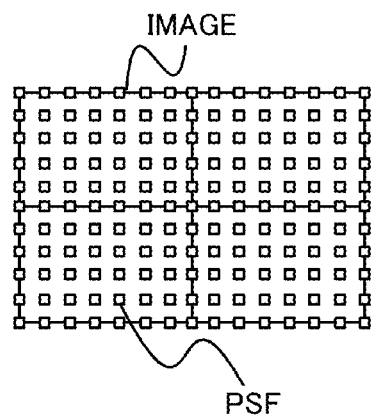
Figure 15E:
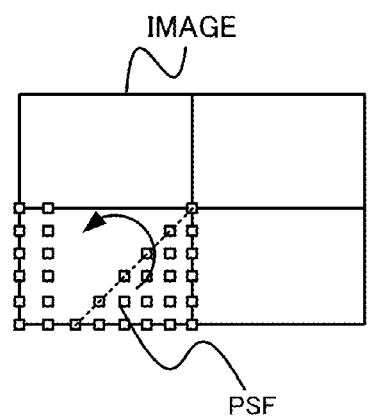

Next, at S106, the computer evaluates an inverse Fourier transform of the OTF at each position (pixel) in the input image so as to generate a point spread function (hereinafter, referred to as the PSF) at the position as illustrated with squares in FIG. 15C. The optical system used to acquire the input image is rotationally symmetric around the optical axis. This rotational symmetry can be used to rotate a PSF generated in a quadrant (quarter region) around the reference position into another quadrant as illustrated in FIG. 15D, thereby generating PSFs in the entire region of the input image. Such a method has the advantage that the inverse Fourier transform is evaluated at the number of times about a quarter of the total number of positions at which the PSFs are arranged. Moreover, when the OTFs illustrated in FIG. 15B and the PSFs illustrated in FIG. 15C are rearranged through rotation and interpolation as illustrated in FIG. 15E and are allocated over the entire region of the input image by using the rotational symmetry as illustrated in FIG. 15D, the number of times the inverse Fourier transform is evaluated can be further reduced.

The arrangements (numbers and intervals) of the OTFs and the PSFs illustrated in FIGS. 15A to 15E are examples, and the arrangements may be optionally set depending on a change in the OTFs of the optical system.

In FIG. 14, at S107, the computer generates unsharp masks based on the PSFs generated at positions (pixels) in the entire region of the input image. The generation of the unsharp masks will be described in detail later. Then, at S108, the computer generates the correction signals described above. The generation of the correction signals will be also described in detail later. In this embodiment, the processing at S107 and S108 is referred to as the correction signal generating step.

Next, at S109, the computer provides the sharpening processing to the input image by adding the correction signals to the input image, and thus acquires a corrected image as an resulting image at S110. The sharpening processing will be described in detail later. In this embodiment, the processing at S109 is referred to as the signal addition process.

The unsharp masks generated at S107 is the same as that illustrated in FIGS. 7A and 7B. To generate the correction signals based on these unsharp masks at S108, the computer first convolves the input image with the unsharp masks generated at positions in the input image. Since the unsharp masks are generated at the positions at which the PSFs are generated as illustrated in FIG. 15D, unsharp masks at positions between the positions at which the PSFs are generated are generated through the interpolation. The interpolation is provided in such a manner that, when a target pixel is a pixel at a position at which an unsharp mask is generated, a plurality of unsharp masks near the target pixel are weighted depending on their distances from the target pixel and synthesized. This method can generate unsharp masks that continuously change with positions in the input image. In this manner, an unsharp mask generated through conversion from the OTF or interpolation of the PSF is applied to the input image at each position in the input image.

Another method involves, for example, applying three unsharp masks near the target pixel for a triangle region surrounded by the three unsharp masks so as to generate three images. Then, these three images are weighted depending on their distances from the position of the target pixel and synthesized so as to obtain a synthesized image equivalent to the image obtained by continuously changing unsharp masks with positions in the input image. The region to be interpolated may be defined by, for example, four positions instead of the three positions.

Alternatively, the input image may be divided into a plurality of regions, and the same unsharp mask may be applied in each region without interpolation. Alternatively, the interpolation may be provided to a sharpened image obtained by applying correction signals generated at S109 described later to the input image.

Next follows a description of the generation of correction signals at S108. In this embodiment, signals represented by Expression (2) are used as the correction signals. Specifically, the correction signals are generated by calculating a difference between the input image and an image as a result of applying unsharp masks to the input image at S108.

Next follows a description of the sharpening processing at S109. The sharpening processing according to this embodiment is executed by adding the correction signals multiplied by a constant (m) to the input image through Expression (1). The constant m is determined with taken into account noises in the image and over and short sharpening. Expression (1) is expressed as an addition of the first term and the second term for a positive constant m and a subtraction thereof for a negative constant m. As described above, the "addition" of the correction signals multiplied with a constant in the sharpening processing according to this embodiment means an addition and a subtraction depending on the sign of the constant m.

As described above, in this embodiment, the sharpening processing is executed by using point spread functions as unsharp masks. This enables accurate correction (sharpening) even when an input image includes degradation often existing in peripheral portions of an image due to asymmetric PSFs of the optical system.

Figure 16:
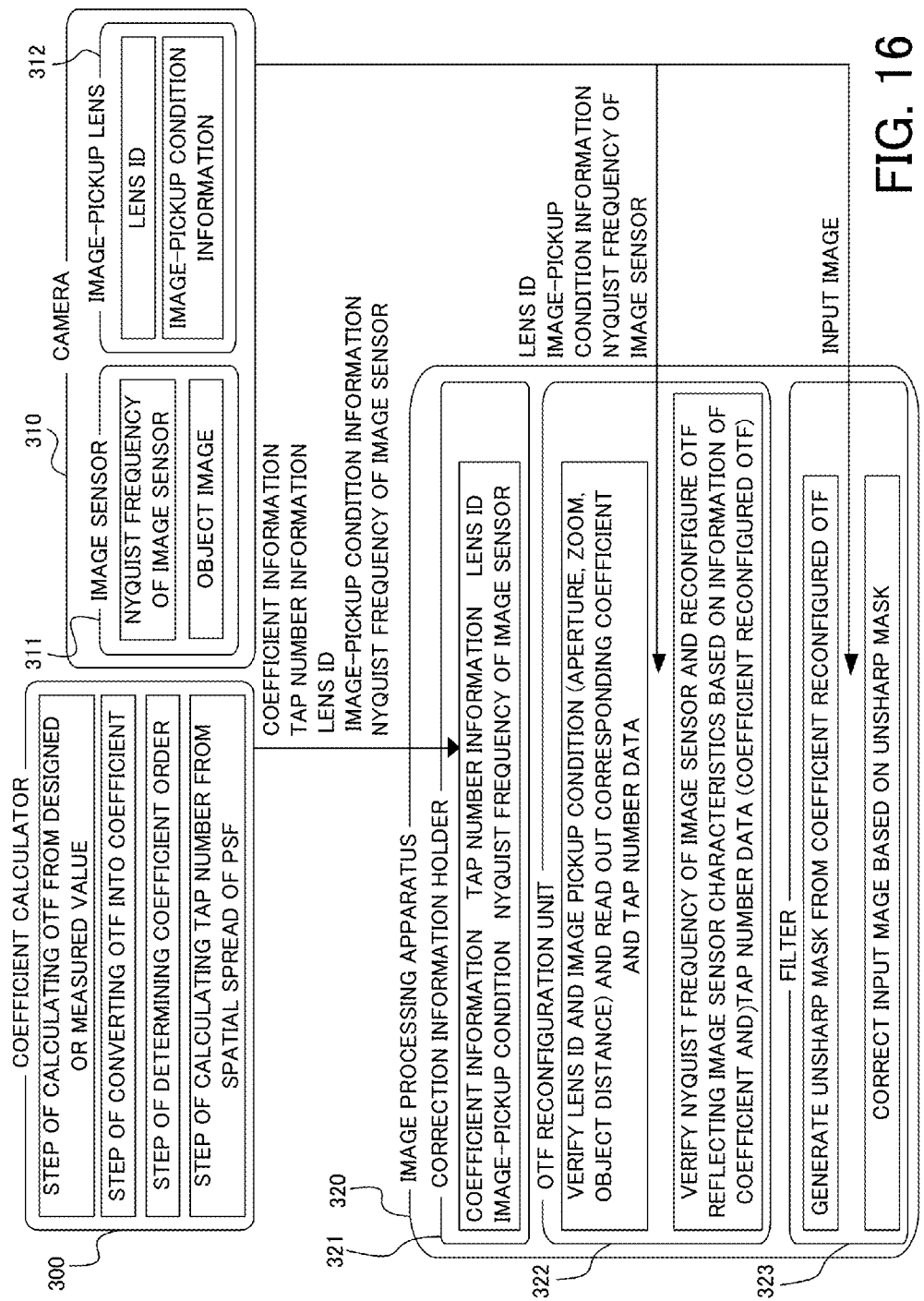
FIG. 16 is a diagram of an image processing system including an image processing apparatus according to Embodiment 4.

Next follows a description of an exemplary image processing system configured to achieve the image processing method described above with reference to FIG. 16. The image processing system includes a coefficient calculator 300, a camera (image pickup apparatus) 310, and an image processing apparatus 320.

The coefficient calculator 300 calculates coefficients for reconfiguring OTFs, from designed values or measured values of the optical system. The coefficient calculator 300 converts the OTFs into coefficients and determines the orders of coefficients used for reconfiguring the OTFs later depending on a required accuracy. The coefficient calculator 300 also determines, based on the sizes of spatial spreads of the PSFs, the number of taps required for reconfiguring the OTFs later for each image height. The coefficient calculator 300 calculates coefficients and the number of taps up to a required order for various combinations of the optical system (interchangeable image-pickup lens 312) and the image sensor 311 constituting the camera 310, and outputs these data.

In the camera 310, an object image formed by the image-pickup lens 312 is photoelectrically converted by the image sensor 311, and an image is generated based on electric signals from the image sensor 311. The camera 310 then adds, to the image, the lens ID, and the image-pickup condition information (such as the aperture value, the focal length of the zoom lens, and the object distance), and the camera ID, and outputs the image. The camera ID is used to determine a Nyquist frequency of spatial frequencies available at the image sensor 111.

The image processing apparatus 320 stores data of coefficients and the number of taps from the coefficient calculator 300 and the input image (including the image-pickup condition information) as the image output from the camera 310. The data and information are then used to correct (sharpen) the input image degraded by the image-pickup lens 312.

In the image processing apparatus 320, a correction information holder 321 stores information of the various combinations of the image-pickup lens 312 and the image sensor 311 calculated by the coefficient calculator 300. The stored information includes data of coefficients and the number of taps, the lens ID, the image-pickup condition information, and the Nyquist frequency of the image sensor 311 obtained based on the camera ID.

An OTF reconfiguration unit 322 acquires the Nyquist frequency of the image sensor 311 of the camera 310, the input image, the image-pickup conditions, and the lens ID. The lens ID and image-pickup conditions of the image-pickup lens 312 used by a user (photographer) in image capturing to generate the input image are then used to search coefficients and the number of taps stored in the correction information holder 321. The OTF reconfiguration unit 322 reconfigures OTFs used by a filter 323 based on the searched information in a range of spatial frequencies up to the Nyquist frequency. Hereinafter, the OTFs reconfigured by the OTF reconfiguration unit 322 are referred to as the reconfigured OTFs.

The filter 323 generates unsharp masks based on the reconfigured OTFs obtained from the OTF reconfiguration unit 322, and corrects (sharpens) the image based on the unsharp masks. If the coefficients and the number of taps calculated by the coefficient calculator 300 are stored in the correction information holder 321, the coefficient calculator 300 does not need to be provided to the user. The user may download and use information needed for image processing such as coefficient data through a network or various kinds of non-transitory computer-readable storage media.

Next follows a description of a method of calculating coefficients by a coefficient calculator 300. The coefficient calculator 300 approximates the OTFs of the optical system (image-pickup lens 312) through a fitting to a function so as to produce coefficients. In this embodiment, the function used in the fitting is, but not limited to, a Legendre polynomial, and may be, for example, a Chebushevpolynomial. The Legendre polynomial is given by Expression (10).

$$P_n(x) = \frac{1}{2^n} \sum_{k=0}^{[\frac{n}{2}]} (-1)^k \frac{(2n-2k)!}{k!(n-k)!(n-2k)!} x^{n-2k} \quad (10)$$

In the expression, [x] denotes a maximum integer not greater than x.

Since the OTF is expressed in z=f(x, y), the coefficient aij of Expression (11) is calculated.

$$z = \sum_{i}^{i=m} \sum_{j}^{j=n} a_{ij} P(x)_i P(y)_j \quad (11)$$

Expression (11) is an orthogonal function, in which the value of aij is determined regardless of the order at the fitting. This characteristics of the orthogonal function can be utilized to, when a low order fitting of the OTF is possible at a sufficiently high accuracy, truncate the function at the low order. This can minimize data amount of coefficients to be stored in the coefficient calculator 300.

Figure 17:
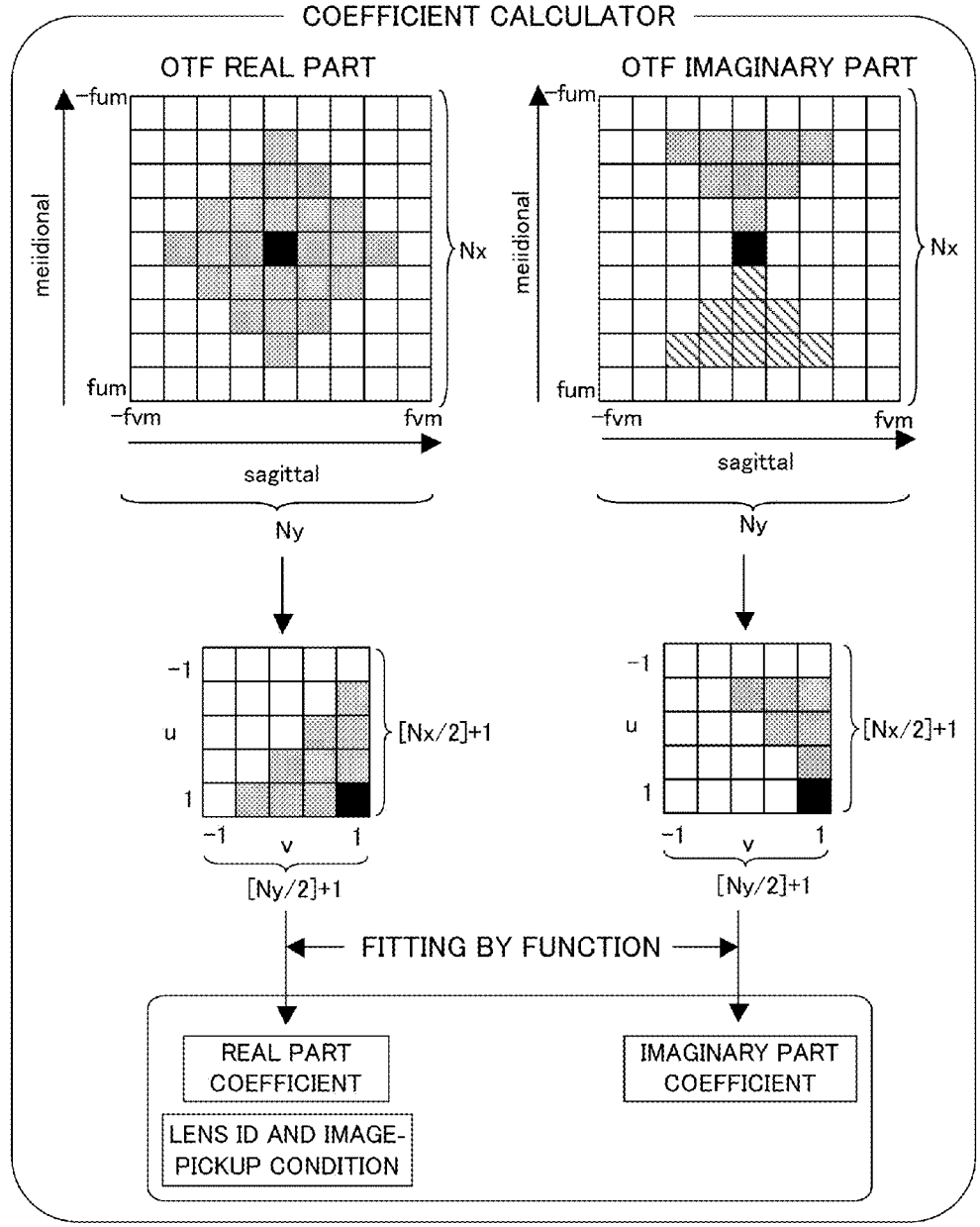
FIG. 17 is an explanatory diagram of coefficient data according to Embodiment 4.

FIG. 17 illustrates a specific method of fitting the OTF through Expression (10) and Expression (11). In FIG. 17, fum and fvm respectively denote the Nyquist frequencies of the OTF in a meridional direction and a sagittal direction. Nx and Ny respectively denote the odd numbers of taps of the OTF in the meridional direction and the sagittal direction. The coefficient calculator 300 calculates coefficients for the real part and the imaginary part of the OTF by the fitting.

The real part of the OTF is symmetric in the meridional direction and the sagittal direction. The imaginary part of the OTF is symmetric with opposite signs in the meridional direction and is symmetric in the sagittal direction.

Owing to such symmetries, information for a quarter of the entire domain is necessary and sufficient as data of the OTF as a fitting target. For this reason, in this embodiment, to achieve a highly accurate fitting of the OTF, the fitting is executed on a quarter region cut out from the entire domain such that a DC component is included, for both of the real part and the imaginary part of the OTF.

This embodiment describes an example in which the OTF data is data for Nx (row)×Ny (column) taps, and data of 1 to [Nx/2]+1 rows and 1 to [Ny/2]+1 columns is cut out from the OTF data. However, this embodiment is not limited thereto.

FIG. 18 illustrates coefficients calculated by the method described above. FIG. 18 illustrates an example of coefficients of the real part and the imaginary part of the OTF that are calculated for each image height (1 to 10) up to the tenth order both in x and y. A coefficient data is constituted by a set of coefficients for each image height together with information of the lens ID, the aperture, the focal length (zoom position), and the object distance. This embodiment exemplarily shows coefficients for ten image heights under image-pickup conditions such as the lens ID of No. 123, the aperture value of F2.8, the zoom position of WIDE (wide-angle side), and the closer object distance. These coefficients for ten image heights are used to reconfigure the OTF at ten positions in FIG. 15A. The generated coefficients may be used as functions of the image height for each order.

The coefficient calculator 300 generates such coefficient data for all combinations of the lens ID, the aperture, the focal length, and the object distance, and outputs the data.

Next follows a detailed description of a method of determining the number of taps of a reconfigured OTF. The duration of the filtering processing on an image largely depends on the number of taps of a filter used in the filtering processing. Thus, a smaller number of taps of the filter are desirable in the filtering processing as long as desired correction effects are obtained without negative effects such as undershoot.

An unsharp mask used by the filter 323 of the image processing apparatus is a filter in a real space. Thus, the number of taps for the filter is determined in the real space. The unsharp mask according to this embodiment is a filter used to correcting an image degradation due to the PSF. Thus, a region nearly equal to the spread of the PSF in the real space is sufficient. In other words, the necessary number of taps is the number of taps in the region. Since the real space and the frequency space are reciprocal, the number of taps determined in the real space can be used in the frequency space.

Figure 19:
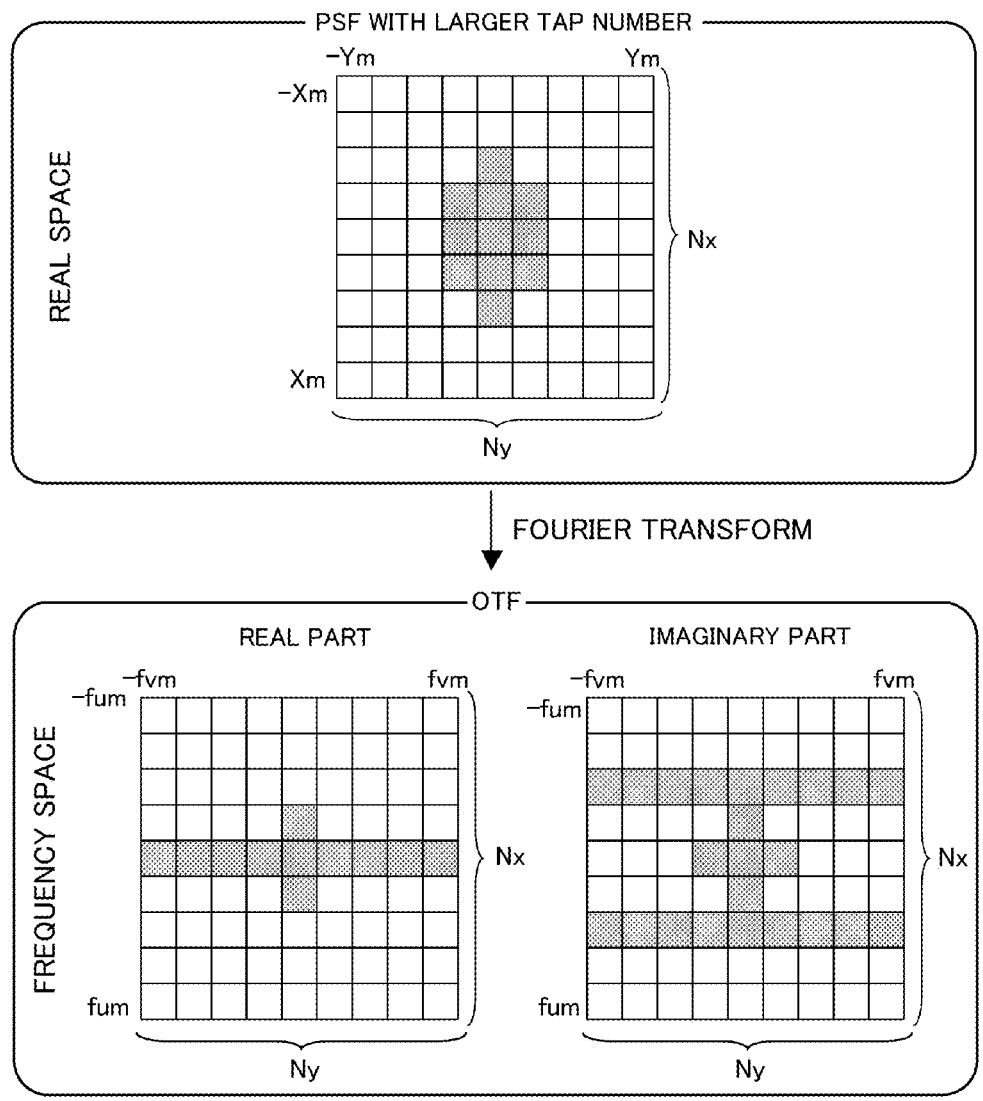
FIG. 19 is an explanatory diagram of the number of taps and a frequency pitch according to Embodiment 4.
Figure 20:
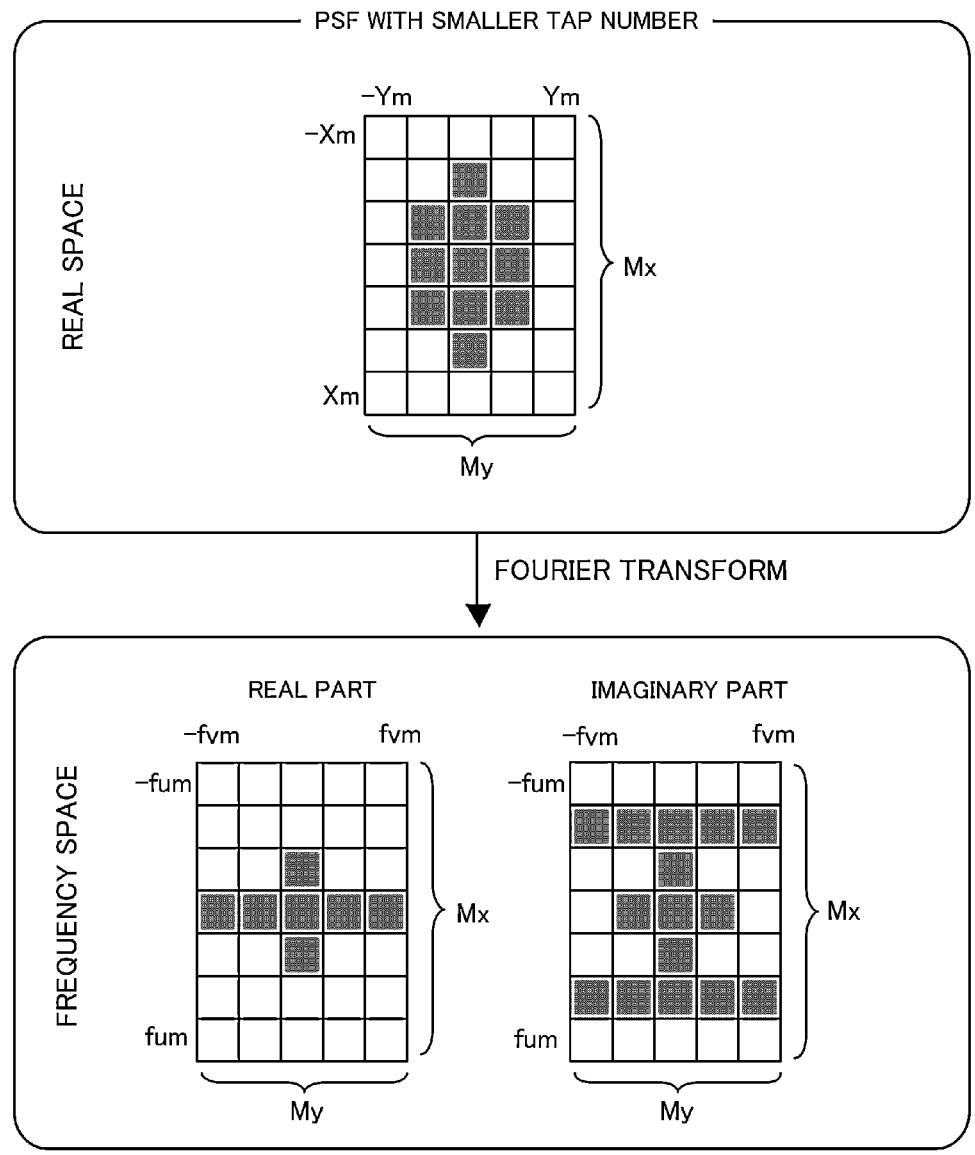
FIG. 20 is an explanatory diagram of another number of taps and a frequency pitch of according to Embodiment 4.

FIG. 19 illustrates that the number of taps is large enough that a sufficiently large region compared to the spatial spread of the PSF is enclosed. FIG. 20 illustrates that the number of taps is set such that a region nearly equal to the spatial spread of the same PSF in FIG. 19 is enclosed (the number of taps is smaller than that in the case of FIG. 19). As illustrated in FIG. 19, the number of taps in the real space corresponds to the minimum frequency pitch in the frequency space. Thus, a smaller number of taps in the real space as illustrated in FIG. 20 means coarse sampling in the frequency space and hence a larger minimum frequency pitch. Meanwhile, the Nyquist frequency in the frequency space does not change.

Next follows a detailed description of the OTF reconfiguration unit 322 that provides processing corresponding to the processing at step S104 illustrated in FIG. 14. The OTF reconfiguration unit 322 acquires the lens ID, the image-pickup condition information, and information of the Nyquist frequency of the image sensor 311 from the camera 310 at image pickup. Next, the OTF reconfiguration unit 322 reads out the number of taps, the lens ID, the image-pickup condition information, and the information of the Nyquist frequency of the image sensor 311 from the correction information holder 321, and generates the reconfigured OTF based on the information.

Figure 21:
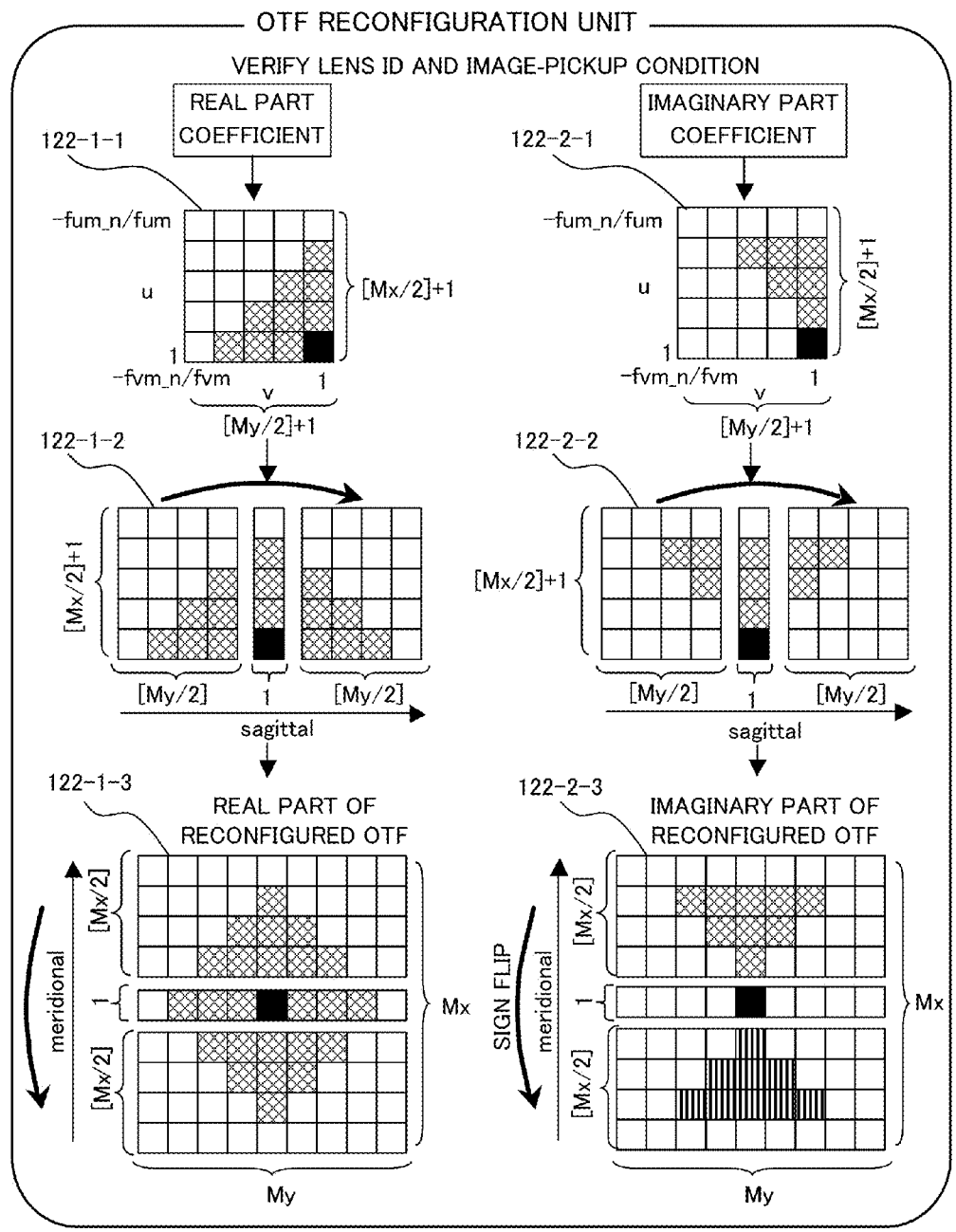
FIG. 21 is an explanatory diagram of reconfiguration of the OTFs according to Embodiment 4.

Next follows a detailed description of a method of generating the reconfigured OTF with reference to FIG. 21. The Nyquist frequencies in the meridional direction and the sagittal direction necessary to generate the reconfigured OTF are respectively denoted by fuc_rm and fvc_im, and the numbers of taps in the meridional direction and the sagittal direction are denoted by Mx and My. With the Nyquist frequencies fum and fvm in the meridional direction and the sagittal direction, the following relationships are held:

$$0 < fum\_n \leq fum$$

$$0 < fvm\_n \leq fvm$$

$$0 < Mx \leq Nx$$

$$0 < My \leq Ny$$

where Mx and My are odd numbers.

The variables x and y in Expression (10) and Expression (11) are respectively replaced with u and m, and domains defined as follows $$-fum\_n/fum \leq u \leq 1$$

$$-fvm\_n/fvm \leq v \leq 1$$

are respectively sampled with (Mx/2)+1 and (My/2)+1 taps. The OTF reconfiguration unit 122 substitutes the coefficients described above into Expression (9) and generates the reconfigured OTF in a quadrant. Such a procedure is repeated for the real part (122-1-1) and the imaginary part (122-2-1) of the reconfigured OTF illustrated in FIG. 21.

Next follows a description of a method of generating, based on a reconfigured OTF having real and imaginary parts generated in a quadrant, a reconfigured OTF in domains defined as follows:

$$-fum\_n/fum \leq u \leq fum\_n/fum$$

$$-fvm\_n/fvm \leq v \leq fvm\_n/fvm$$

with the numbers of taps are Mx and My.

First, a method of generating the real part of the reconfigured OTF will be described. The OTF reconfiguration unit 322 divides, based on the previously generated real part (122-1-1), the real part of the reconfigured OTF into regions below:
a region of rows 1 to (Mx/2)+1 and columns 1 to (My/2); and a region of rows 1 to (Mx/2)+1 and column (My/2)+1.

Next, the OTF reconfiguration unit 322 copies numerical data in the region of rows 1 to (Mx/2)+1 and columns 1 to (My/2) onto a region of rows 1 to (Mx/2)+1 and columns (My/2)+2 to My as illustrated in the real part (122-1-2). The data is copied in a line-symmetrical manner with respect to the region of rows 1 to (Mx/2)+1 and column (My/2)+1.

Then, the OTF reconfiguration unit 322 divides the real part (122-1-2) of the reconfigured OTF generated for a half region into a region of rows 1 to (Mx/2) and columns 1 to My and a region of row (Mx/2)+1 and columns 1 to My as illustrated in the real part (122-1-3). Then, the OTF reconfiguration unit 322 copies numerical data in the region of rows 1 to (Mx/2) and columns 1 to My onto a region of rows (Mx/2)+2 to Mx and columns 1 to My in a line-symmetrical manner with respect to the region of row (Mx/2)+1 and columns 1 to My.

Next follows a description of a method of generating the imaginary part of the reconfigured OTF. Although the imaginary part can be generated in the same method as that of the real part, the imaginary part (122-2-3) needs to be generated with the sign flipped. Such a generating method can be employed because of the characteristics of the real and imaginary parts of the OTF.

Figure 22:
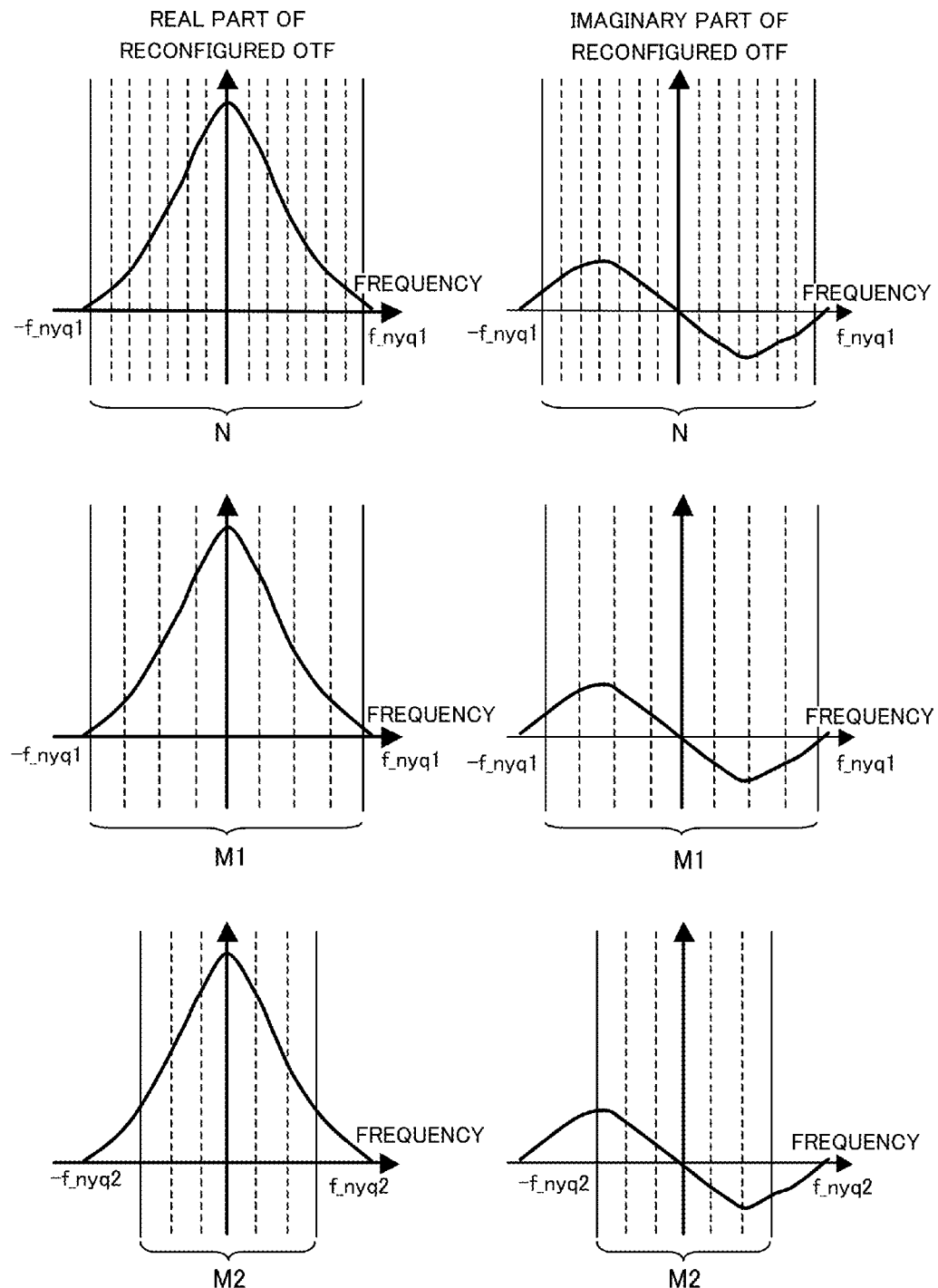
FIG. 22 is a detailed explanatory diagram of the reconfiguration of the OTFs according to Embodiment 4.

FIG. 22 illustrates a section of the reconfigured OTF for a detailed description of the relationship between the Nyquist frequency of the reconfigured OTF and the number of taps. As described above, the Nyquist frequency is a parameter determined by spatial resolution of the image sensor 311, and the number of taps is a parameter depending on the PSF of the image-pickup lens 312. These two parameters can be used with the coefficients so as to generate a desired reconfigured OTF.

In FIG. 22, the Nyquist frequencies satisfy f_nyq1>f_nyq2, and the numbers of taps satisfy N>M1>M2. As illustrated in FIG. 22, the Nyquist frequency and the number of taps can be controlled to be desired values.

Consequently, the OTFs corresponding to the combinations of the image sensor 311 and the image-pickup lens 312 and the image-pickup conditions are stored as coefficient data in the image processing apparatus 320, which enables image processing corresponding to the image-pickup conditions at image pickup.

As illustrated in FIGS. 15A to 15E, the entire region of an image can be corrected with an appropriate number of taps using a small amount of coefficient data, and thus the amount of held data can be reduced.

Figure 23:
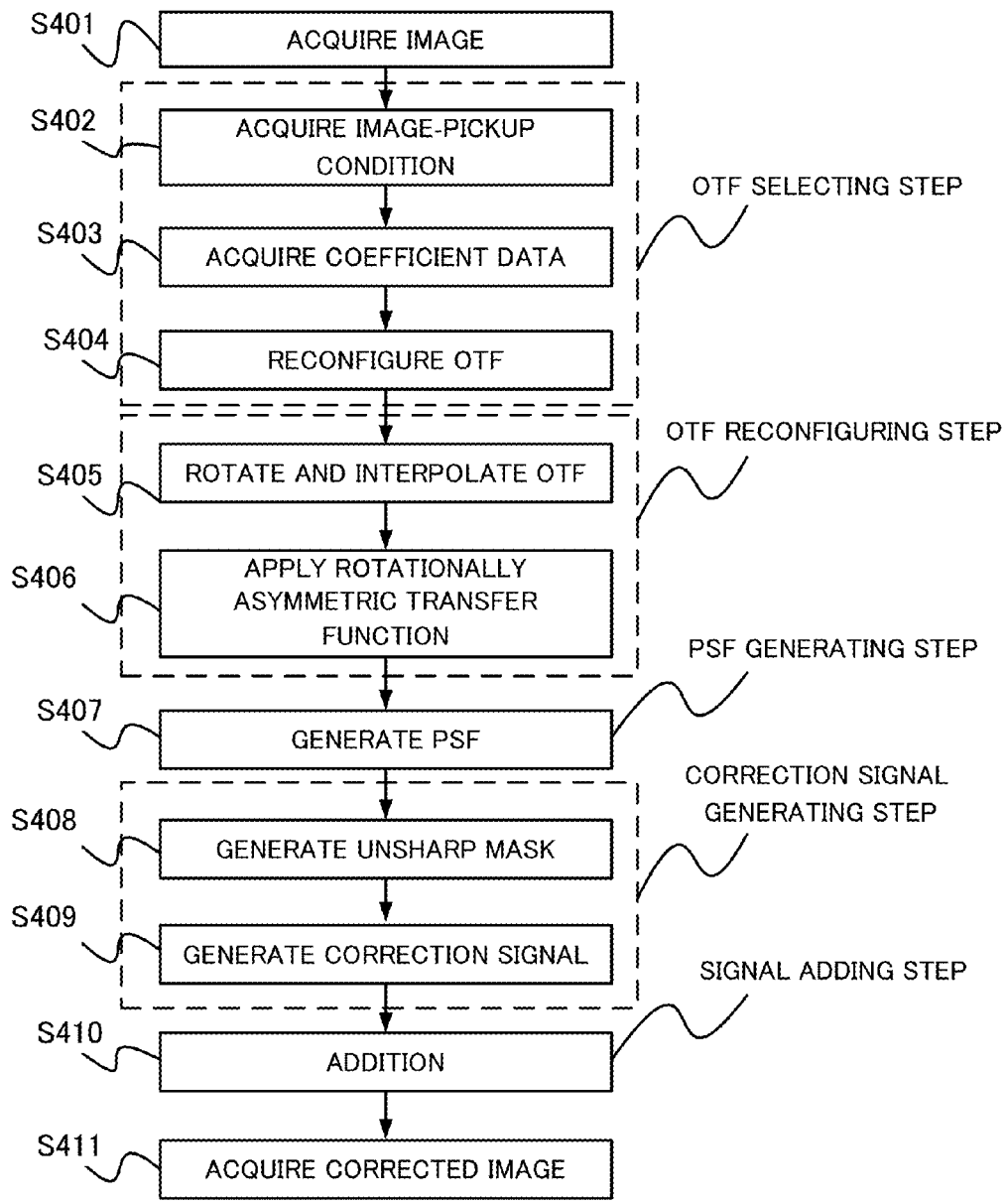
FIG. 23 is a flowchart of a modified example of the image processing according to Embodiment 4.

FIG. 23 illustrates a modified example of this embodiment. Steps S401 to S405 in FIG. 23 are the same as steps S101 to S105 in FIG. 14, and thus description thereof will be omitted. The processing up to step S405 two-dimensionally arranges the OTFs in a quadrant of the input image as illustrated in FIG. 15B, for example.

This modified example describes a transfer function having no rotational symmetry (hereinafter, referred to as a rotationally asymmetric transfer function) such as a transfer function of an optical low-pass filter or a pixel opening shape, unlike a transfer function of the image pickup optical system.

At step S406, the computer applies a rotationally asymmetric transfer function to each OTF in the state illustrated in FIG. 15B. Then, at steps S407 to S411, the computer provides the same processing as that at steps S106 to S110 in FIG. 14 so as to acquire a corrected image obtained by sharpening the input image.

In FIG. 15B, the OTFs are two-dimensionally arranged in the quadrant of the image. However, depending on a symmetric property of a transfer function, the OTFs may be arranged, for example, over the entire region of the image before a rotationally asymmetric transfer function is applied.

Embodiment 5

Figure 24:
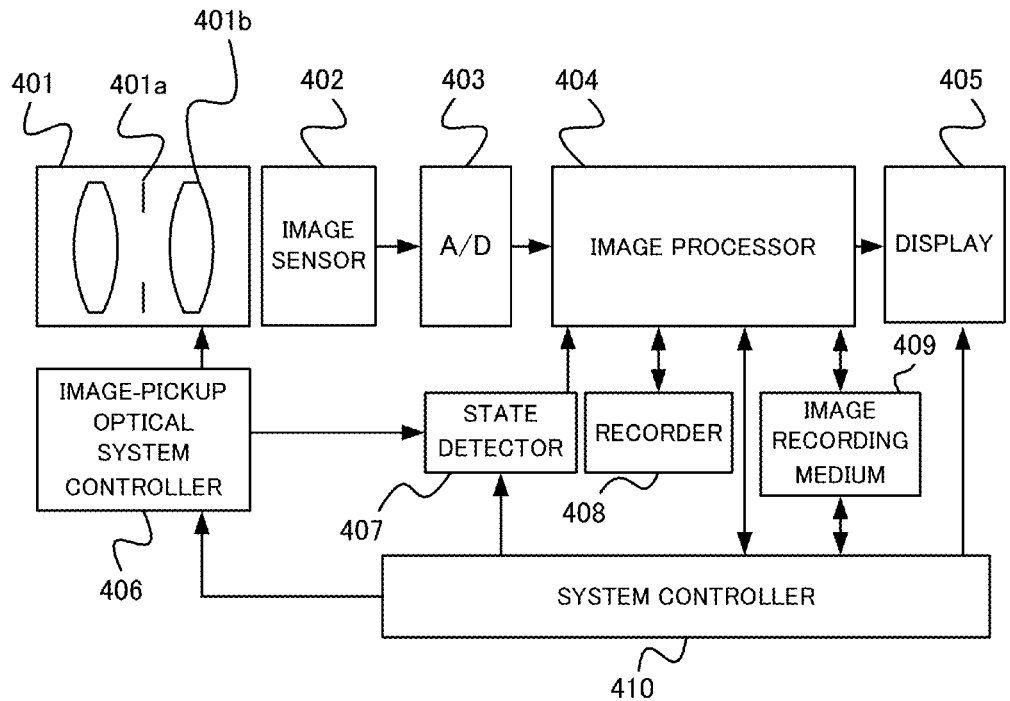
FIG. 24 illustrates the configuration of an image pickup apparatus according to Embodiment 5 of the present invention.

FIG. 24 illustrates the configuration of an image pickup apparatus according to Embodiment 5 of the present invention. The image pickup apparatus is installed with an image processing program that executes image processing of sharpening an image as the input image. This image processing is executed by a computer (processor) included in an image processor (image processing apparatus) 404 provided in the image pickup apparatus, following the image processing program.

The image pickup optical system 401 images light from an object (not illustrated) onto the image sensor 402. An aperture stop 401a in the image pickup optical system 401 has its opening diameter controlled with its aperture value being variable. A focus lens 401b has its position changed by an autofocus (AF) mechanism or a manual focus mechanism (not illustrated) so as to focus in response to an object distance. The image pickup optical system 401 may have optical elements such as a low-pass filter or an infrared cut filter inserted. The influence of an element such as a low-pass filter on the characteristics of the OTF of the image pickup optical system 401 needs to be taken into account when the point spread function is generated. When a rotationally asymmetric transfer function is used, as described with reference to FIG. 23, the rotationally asymmetric transfer function is applied after the OTFs are rearranged. The rotationally asymmetric transfer function is, for example, a function representing an optical low-pass filter and a pixel opening shape.

The image sensor 402 photoelectrically converts an object image and outputs an analog electric signal. This analog electric signal is converted into a digital signal by an A/D convertor 403, and the digital signal is input to the image processor 404.

The image processor 404 provides predetermined processing to the digital signal so as to generate an image, and this image as an input image is provided with sharpening processing. Specifically, the image processor 404 acquires image-pickup condition information such as the aperture value, the object distance, and the focal length of the zoom lens at image pickup from a state detector 407. The state detector 407 may acquire the image-pickup condition information directly from a system controller 410, or may acquire the image-pickup condition information about, for example, the image pickup optical system 401 from an image pickup optical system controller 406.

Figure 25:
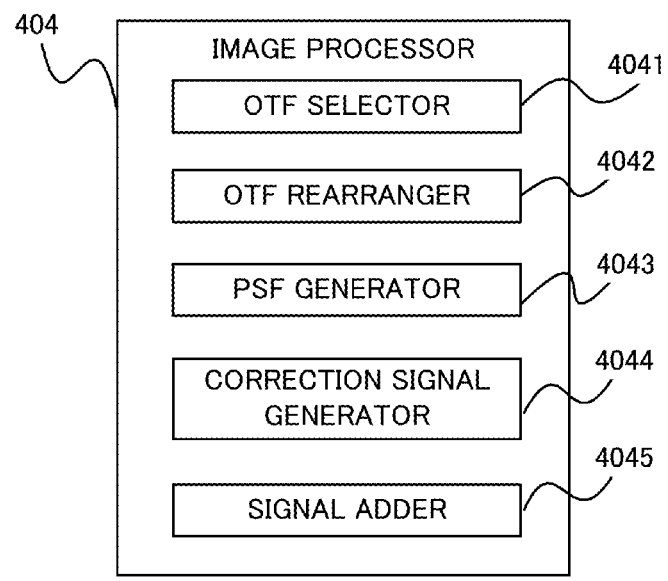
FIG. 25 is an explanatory diagram of an image processor provided in an image pickup apparatus according to Embodiment 5.

Then, the image processor 404 provides the image processing described with the flowchart in FIG. 14 or FIG. 23 so as to sharpen the input image. To provide this processing, the image processor 404 includes, as illustrated in FIG. 25, an optical transfer function selector 4041, an optical transfer function rearranger 4042, an point spread function generator 4043, a correction signal generator 4044, and a signal adder 4045. These components execute the optical transfer function selecting step, the optical transfer function rearranging step, the point spread function generating step, the correction signal generating step, and the signal adding step in FIGS. 14 and 23.

As illustrated in FIG. 24, the image pickup apparatus includes a recorder 408 that stores coefficient data for generating reconfigured OTFs.

A corrected image (output image) generated by the image processor 404 is stored in a predetermined format in an image recording medium 409. The corrected image is displayed on a display 405.

The series of processing is controlled by a system controller 410. The mechanical drive of the image pickup optical system 401 is controlled by the image pickup optical system controller 406 instructed by the system controller 410.

In this embodiment, the image pickup optical system 401 constitutes the image pickup apparatus, but may be detachable from the image pickup apparatus (lens interchangeable camera body) including the image sensor. When a lens interchangeable camera is employed, coefficient data may be communicated from a storage in a lens to the camera body and stored therein. The coefficient data can be used in common between various Nyquist frequencies of the image sensor and characteristics of an optical low-pass filter in the camera body as described above, and thus the amount of coefficient data to be handled can be reduced.

According to Embodiments 4 and 5, a point spread function corresponding to an image-pickup condition and an image height is used as an unsharp mask, so that favorable (highly accurate) sharpening processing can be provided to an input image. Moreover, according to each embodiment of the present invention, since optical transfer functions are two-dimensionally arranged on the input image before they are converted into point spread functions in the real space, optical transfer functions before two-dimensionally arranged can be shared between a plurality of image pickup apparatuses having different pixel pitches. This can reduce the data amount of optical transfer functions necessary to be previously stored.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-211503, filed Oct. 9, 2013, Japanese Patent Application No. 2013-254578 filed Dec. 9, 2013 and Japanese Patent Application No. 2014-178610 filed Sep. 3, 2014 which are hereby incorporated by reference herein in their entirety.

What is claimed is:

1. An image processing apparatus comprising:
   an acquisition unit configured to acquire an image generated by image pickup through an optical system; and
   a processor configured to provide unsharp mask processing to the image by using a filter generated based on information of a point spread function of the optical system corresponding to an image-pickup condition of the optical system, wherein the filter used for the unsharp mask processing to the image includes a filter where two-dimensional tap data is rotationally asymmetrically distributed.

2. The image processing apparatus according to claim 1, wherein the processor includes:
a generator configured to generate a correction signal by calculating a difference between the image and an image obtained by applying the filter to the image generated by image pickup through the optical system; and
a sharpener configured to sharpen the image by multiplying the correction signal generated by the generator by a constant and by adding a multiplied correction signal to the image, or by adjusting the correction signal generated by the generator with an adjustment coefficient depending on a position in the image and by adding an adjusted correction signal to the image.

3. The image processing apparatus according to claim 1, wherein the processor includes:
a generator configured to generate a correction signal by convolving the image with a filter generated based on difference information between a point spread function of the optical system corresponding to an image-pickup condition of the optical system and an ideal point image; and
a sharpener configured to sharpen the image by multiplying the correction signal generated by the generator by a constant and by adding a multiplied correction signal to the image, or by adjusting the correction signal generated by the generator with an adjustment coefficient depending on a position in the image and by adding an adjusted correction signal to the image.

4. The image processing apparatus according to claim 1, wherein the processor includes:
a generator configured to generate a filter by multiplying difference information between a point spread function of the optical system corresponding to an image-pickup condition of the optical system and an ideal point image by a constant and by adding a multiplied difference information to the ideal point image, or by adjusting the difference information with an adjustment coefficient depending on a position in the image and by adding adjusted difference information to the ideal point image; and
a sharpener configured to sharpen the image through a convolution with the filter generated by the generator.

5. The image processing apparatus according to claim 1, wherein the processor includes:
a generator configured to generate a filter based on difference information between a product of an ideal point image and a sum of 1 and a constant and a product of the constant and a point spread function of the optical system corresponding to an image-pickup condition of the optical system, or based on difference information between a product of the ideal point image and a sum of 1 and an adjustment coefficient depending on a position in the image and a product of the adjustment coefficient and the point spread function of the optical system; and
a sharpener configured to sharpen the image through a convolution with the filter generated by the generator.

6. The image processing apparatus according to claim 1 further comprising an acquisition unit configured to acquire information of a point spread function of the optical system based on an image-pickup condition of the optical system.

7. The image processing apparatus according to claim 1, wherein the image-pickup condition includes at least one of an image height, a focal length, an F-number, and an object distance.

8. The image processing apparatus according to claim 1, wherein the filter used for the unsharp mask processing to the image includes a filter where the two-dimensional tap data is asymmetrically distributed in an image height direction and directions other than the image height direction.

9. The image processing apparatus according to claim 1, wherein the processor provides the unsharp mask processing for each or one of a plurality of color components constituting the image.

10. The image processing apparatus according to claim 1, wherein the image is image data discretely and regularly arrayed for each color component, and
wherein the processor provides the unsharp mask processing to an image interpolated for a correction target color component.

11. The image processing apparatus according to claim 1, wherein the processor includes an acquirer to acquire information of the point spread function of the optical system based on the image-pickup condition of the optical system,
wherein the acquirer acquires point spread functions for at least two image heights for each of a plurality of regions set in the image, and
wherein the processor performs interpolation processing in an image height direction with a plurality of image data obtained from point spread functions corresponding to a plurality of regions in the image so as to generate one image data, and generates the correction signal based on the one image data generated at the interpolation processing.

12. The image processing apparatus according to claim 1, wherein the processor includes an acquirer to acquire information of the point spread function of the optical system based on the image-pickup condition of the optical system,
wherein the acquirer acquires point spread functions for at least two image heights for each of a plurality of regions set in the image, and
wherein the processor generates a plurality of correction signals based on a plurality of point spread functions, performs interpolation processing in an image height direction with the correction signals so as to generate one correction signal, and applies the one correction signal to the image.

13. The image processing apparatus according to claim 1, wherein the processor includes an acquirer to acquire information of the point spread function of the optical system based on the image-pickup condition of the optical system,
wherein the acquirer acquires point spread functions for at least two image heights for each of a plurality of regions set in the image, and
wherein the processor generates a plurality of correction signals based on a plurality of point spread functions, acquires a plurality of sharped images by applying the correction signals to the image, and performs interpolation processing in an image height direction with the sharpened images so as to generate one sharpened image.

14. An image pickup apparatus comprising:
an image sensor configured to photoelectrically convert an optical image of an object formed through an optical system;

an image processor configured to process an image obtained from the image sensor; and a recorder configured to store a relationship between an image-pickup condition of the optical system and a point spread function of the optical system, wherein the image processor acquires information of a point spread function of the optical system corresponding to an image-pickup condition of the optical system from the recorder and provides unsharp mask processing to the image by using a filter generated based on information of the point spread function of the optical system, and wherein the filter used for the unsharp mask processing to the image includes a filter where two-dimensional tap data is rotationally asymmetrically distributed.

15. The image pickup apparatus according to claim 14, wherein the image pickup apparatus further includes the optical system.

16. An image processing method comprising the steps of:

acquiring an image generated by image pickup through an optical system; and providing unsharp mask processing to the image by using a filter generated based on information of a point spread function of the optical system corresponding to an image-pickup condition of the optical system, wherein the filter used for the unsharp mask processing to the image includes a filter where two-dimensional tap data is rotationally asymmetrically distributed.

17. A non-transitory computer-readable storage medium storing an image processing program that causes a computer to execute processing comprising the steps of:

acquiring an image generated by image pickup through an optical system; and providing unsharp mask processing to the image by using a filter generated based on information of a point spread function of the optical system corresponding to an image-pickup condition of the optical system, wherein the filter used for the unsharp mask processing to the image includes a filter where two-dimensional tap data is rotationally asymmetrically distributed.

* * * * *